US010146484B2

United States Patent
Kunieda et al.

(10) Patent No.: US 10,146,484 B2
(45) Date of Patent: Dec. 4, 2018

(54) INFORMATION PROCESSING APPARATUS, CONTROL METHOD FOR INFORMATION PROCESSING APPARATUS, AND NON-TRANSITORY COMPUTER-READABLE STORAGE MEDIUM FOR CONTROLLING DISPLAY OF AN INDICATOR

(71) Applicant: CANON KABUSHIKI KAISHA, Tokyo (JP)

(72) Inventors: Hiroyasu Kunieda, Yokohama (JP); Naoki Sumi, Kawasaki (JP); Tomohiro Suzuki, Kawasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/496,201

(22) Filed: Apr. 25, 2017

(65) Prior Publication Data
US 2017/0228199 A1  Aug. 10, 2017

Related U.S. Application Data

(63) Continuation of application No. 14/740,752, filed on Jun. 16, 2015, now Pat. No. 9,671,981.

(30) Foreign Application Priority Data

Jun. 30, 2014  (JP) .................................. 2014-135175

(51) Int. Cl.
G06F 3/12 (2006.01)

(52) U.S. Cl.
CPC .......... *G06F 3/1206* (2013.01); *G06F 3/1207* (2013.01); *G06F 3/1232* (2013.01);
(Continued)

(58) Field of Classification Search
None
See application file for complete search history.

(56) References Cited

U.S. PATENT DOCUMENTS

| 6,292,273 B1 | 9/2001 | Dow et al. |
| 6,999,082 B2 | 2/2006 | Nishimura |

(Continued)

FOREIGN PATENT DOCUMENTS

| JP | 2001-243217 A | 9/2001 |
| JP | 2006-350557 A | 12/2006 |

(Continued)

OTHER PUBLICATIONS

Steve Gill, "cordova-plugin-media", GitHub (Jun. 22, 2013), https://github.com/apache/cordova-plugin-media/blob/b5f24d736dbe9149d9ac14d7063f140d27fd2ea4/docs/media.md.

(Continued)

*Primary Examiner* — Henok A Shiferaw
(74) *Attorney, Agent, or Firm* — Fitzpatrick, Cella, Harper & Scinto

(57) ABSTRACT

An information processing apparatus capable of performing a software program including a first program layer with an instruction set to be interpreted and performed by a processor and a second program layer with an instruction set compiled in advance by a unit other than the processor comprises a unit configured to transmit parameter information used for image processing from the first program layer to the second program layer, a unit configured to perform the image processing in the second program layer according to the parameter information, a display control unit configured to display an indicator for allowing a user to recognize that the image processing is in progress, and a unit configured to issue an instruction to control display of the indicator from the second program layer to the first program layer, the
(Continued)

display control unit controls the display according to the instruction.

19 Claims, 20 Drawing Sheets

(52) U.S. Cl.
CPC .......... *G06F 3/1245* (2013.01); *G06F 3/1259* (2013.01); *G06F 3/1288* (2013.01); *G06F 3/1292* (2013.01)

(56) References Cited

U.S. PATENT DOCUMENTS

| | | | |
|---|---|---|---|
| 7,978,909 | B2 | 7/2011 | Umeda |
| 8,045,795 | B2 | 10/2011 | Umeda |
| 8,374,439 | B2 | 2/2013 | Hori |
| 9,055,263 | B2 | 6/2015 | Umeda et al. |
| 9,436,413 | B2 | 9/2016 | Mizoguchi et al. |
| 9,465,571 | B2 | 10/2016 | Kato et al. |
| 9,471,284 | B2 | 10/2016 | Kurokawa et al. |
| 9,582,232 | B2 | 2/2017 | Umeda et al. |
| 2001/0029542 | A1 | 10/2001 | Nishimura |
| 2002/0171867 | A1 | 11/2002 | Nobuhara et al. |
| 2006/0280362 | A1 | 12/2006 | Umeda |
| 2008/0068635 | A1* | 3/2008 | Asano .................. G06F 3/1204 358/1.13 |
| 2008/0123130 | A1* | 5/2008 | Matsumoto ........... G06F 3/1207 358/1.15 |
| 2008/0123135 | A1 | 5/2008 | Inoue |
| 2009/0103124 | A1* | 4/2009 | Kimura ................. G06F 3/1204 358/1.15 |
| 2009/0324091 | A1 | 12/2009 | Hod |
| 2010/0303351 | A1 | 12/2010 | Umeda et al. |
| 2010/0310167 | A1 | 12/2010 | Umeda |
| 2015/0363144 | A1 | 12/2015 | Suzuki et al. |
| 2015/0365546 | A1 | 12/2015 | Umeda et al. |
| 2015/0378643 | A1 | 12/2015 | Sumi et al. |
| 2015/0378653 | A1 | 12/2015 | Goto et al. |
| 2015/0379741 | A1 | 12/2015 | Obayashi et al. |

FOREIGN PATENT DOCUMENTS

| | | |
|---|---|---|
| JP | 2010-010938 A | 1/2010 |
| JP | 2010-278708 A | 12/2010 |
| JP | 2012-043163 A | 3/2012 |
| JP | 2013-080470 A | 5/2013 |

OTHER PUBLICATIONS

"Changing architecture to improve usability: the new wave of mobile app development", Nikkei Systems, Nikkei BP Inc., Japan, 244th Issue (Jul. 26, 2013), pp. 30-33.

Jacob Seidelin, "HTML5 games: creating fun with HTML5, CSS3, and WebGL", Nikkei BP Inc., Japan, 1st Edition (Jun. 24, 2013), pp. 276-288.

Saito Nobuo, et al., "Support for Development of Hybrid Applications in iOS," Information Processing Society of Japan Symposium, Programming Symposium, Winter, 54th, Jan. 11, 2013, pp. 89-98.

"High-speed Execution and Development of Rails 4," WEB+DB Press, 1st edition, Gijutsu-Hyohron Co., Ltd., Japan, Mar. 25, 2013, vol. 73, pp. 63-69.

Office Action dated Nov. 21, 2016, in Japanese Patent Application No. 2014-135175.

\* cited by examiner

F I G. 11
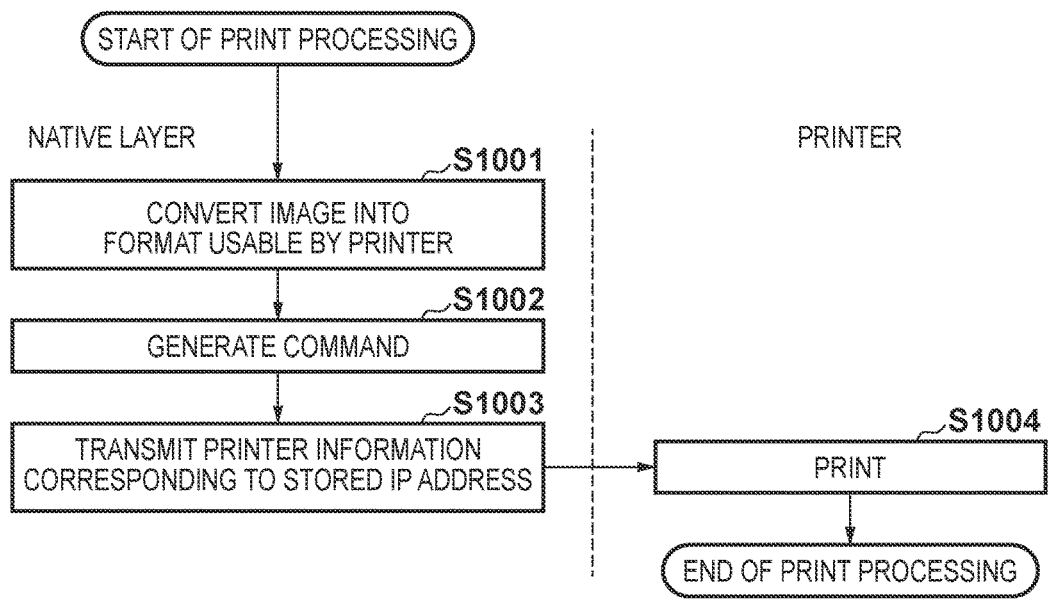

F I G. 21
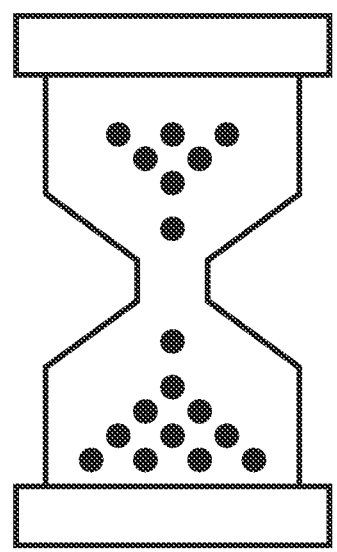

INFORMATION PROCESSING APPARATUS, CONTROL METHOD FOR INFORMATION PROCESSING APPARATUS, AND NON-TRANSITORY COMPUTER-READABLE STORAGE MEDIUM FOR CONTROLLING DISPLAY OF AN INDICATOR

This application is a continuation of application Ser. No. 14/740,752 filed Jun. 16, 2015.

BACKGROUND OF THE INVENTION

Field of the Invention

The present invention relates to an information processing technique.

Description of the Related Art

A mobile computer is basically formed from three elements, that is, hardware as the computer itself, an operating system (to be referred to as an OS hereinafter) operating on the hardware, and an application operating on the OS. By using the application, the user can use a function such as that of a map, mail, or browsing of a Web site on the Internet.

As examples of the form of such application operating on the mobile computer, there are mainly two application forms, that is, a native application and Web application. The features of each application form will be explained below.

The native application is developed by using a development environment and development language which are prepared for each OS. For example, the C/C++ language is used on an OS provided by company A, the Java® language is used on an OS provided by company B, and a different development language is used on an OS provided by company C. In general, the native application is compiled in advance in each development environment, and converted from a so-called high-level language understandable by a human into instruction sets such as an assembler language interpretable by the CPU of the computer. Thus, the general native application has an advantage that it is possible to perform an operation at high speed since the CPU directly interprets instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

Recently, various kinds of OSs are used as the mobile computers have become widespread. Hence, an important challenge in software development is how to develop applications that operate on the OSs in a short time and offer them to users speedily.

In software development, a method called cross development is used. Cross development is a method of developing most part of an application using a common program language cross-sectionally usable for various OSs. Since the common program language is used, the man-hours to independently develop an application for each OS become unnecessary, and this method is known as an effective development method.

The Web application is one of software programs developed by using a common program language cross-sectionally usable for various OSs. However, the Web application operates on the browser and cannot therefore be distributed from Web sites such as application stores run by vendors as a native application. Many developers desire a cross development method in a native application which can be distributed from Web sites.

As one of cross development methods for distributable software, a hybrid application described in Japanese Patent Laid-Open No. 2013-80470 has received attention. In the hybrid application, the application itself is distributed to users as a native application. However, all or most of user interfaces (UIs) are described in a Web standard language such as HTML5, CSS, or JavaScript. That is, one application includes a native layer and a script layer using a Web standard language. When such arrangement is employed, it is possible to develop software that makes use of both the advantage of the native application and that of the Web application.

The Web application performs all processes in the script layer. Therefore, when performing processing such as image processing with a heavy load, the processing time becomes long. To cope with this, in the arrangement of the hybrid application, it is possible to shorten the processing time by separating image processing, and causing the native layer capable of performing a high-speed operation to perform the image processing.

Since, however, the script layer and native layer use different description languages, data associated with image processing cannot be directly communicated between the script layer and native layer. Therefore, the script layer is not notified of the status of the native layer such as the processing status, and thus the user may not be notified of the progress status of the processing.

SUMMARY OF THE INVENTION

The present invention has been made to solve the above problems, and provides an apparatus use environment with higher flexibility and convenience.

According to the first aspect of the present invention, there is provided an information processing apparatus capable of performing a software program including a first program layer with an instruction set to be interpreted and performed by a processor and a second program layer with an instruction set compiled in advance by a unit other than the processor, comprising: a transmission unit configured to transmit parameter information used for performing image processing from the first program layer to the second program layer; an image processing unit configured to perform the image processing in the second program layer in accordance with the parameter information; a display control unit configured to display an indicator for allowing a user to recognize that the image processing is in progress; and an instruction unit configured to issue an instruction to control display of the indicator from the second program layer to the first program layer, wherein the display control unit controls display of the indicator according to the instruction.

According to the second aspect of the present invention, there is provided a control method for an information processing apparatus capable of performing a software program including a first program layer with an instruction set to be interpreted and performed by a processor and a second program layer with an instruction set compiled in advance by a unit other than the processor, the method comprising: transmitting parameter information used for performing image processing from the first program layer to the second program layer; performing the image processing in the second program layer in accordance with the parameter information; displaying an indicator for allowing a user to recognize that the image processing is in progress; and issuing an instruction to control display of the indicator from the second program layer to the first program layer, wherein display of the indicator is controlled according to the instruction.

According to the third aspect of the present invention, there is provided a non-transitory computer-readable storage medium storing a computer program for causing a computer capable of performing a software program including a first program layer with an instruction set to be interpreted and performed by a processor and a second program layer with an instruction set compiled in advance by a unit other than the processor, to function as a transmission unit configured to transmit parameter information used for performing image processing from the first program layer to the second program layer, an image processing unit configured to perform the image processing in the second program layer in accordance with the parameter information, a display control unit configured to display an indicator for allowing a user to recognize that the image processing is in progress, and an instruction unit configured to issue an instruction to control display of the indicator from the second program layer to the first program layer, wherein display of the indicator is controlled according to the instruction.

Further features of the present invention will become apparent from the following description of exemplary embodiments (with reference to the attached drawings).

BRIEF DESCRIPTION OF THE DRAWINGS

FIG. 11 is a flowchart illustrating details of print processing;

FIG. 21 is a view showing an example of an indicator.

DESCRIPTION OF THE EMBODIMENTS

First Embodiment

In this embodiment, an arrangement in which a hybrid application (to be described later) is operated on an information processing apparatus, various kinds of image processing are applied to an image selected by the user, and then the image is printed will be explained.

<Description of Hardware Arrangement>

Figure 1:
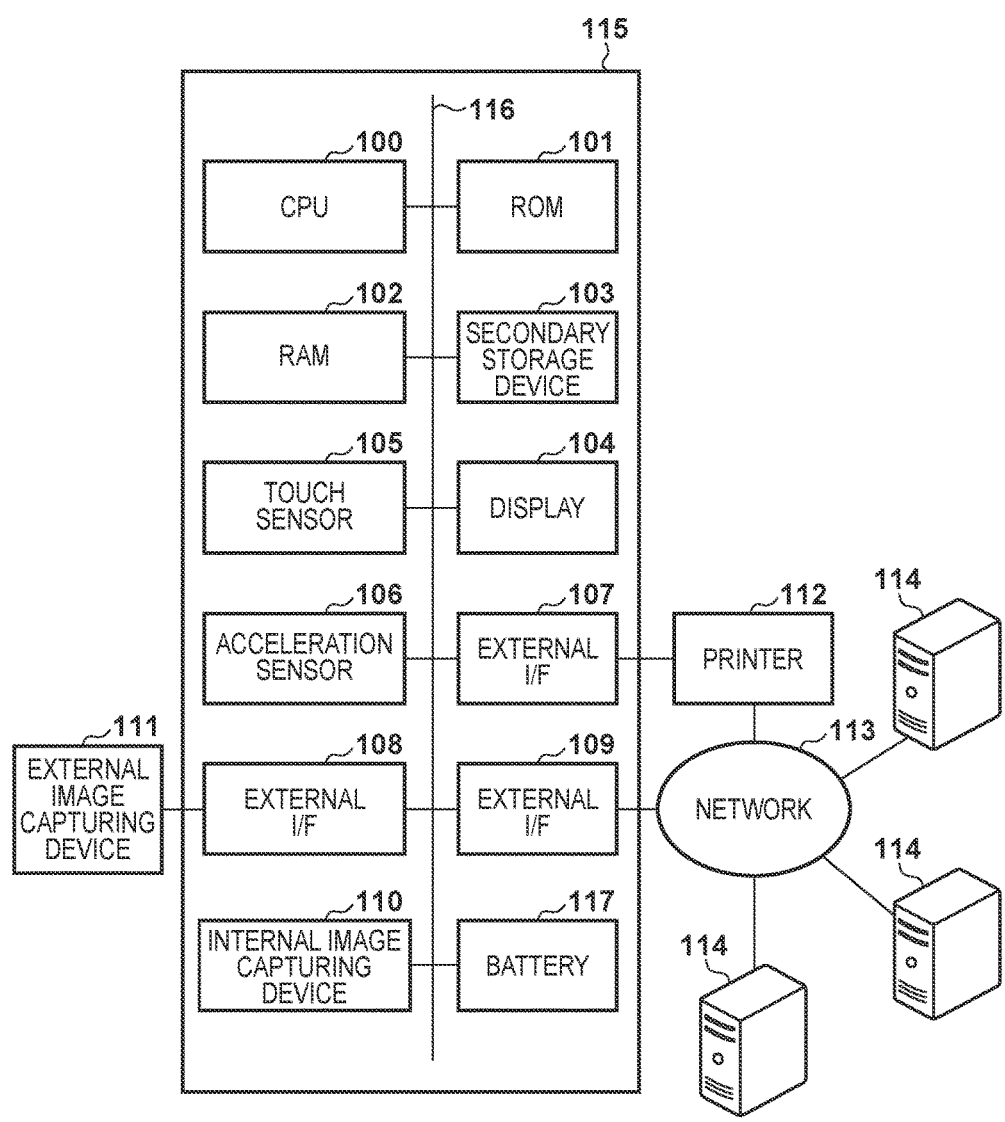
FIG. 1 is a block diagram showing the arrangement of an information processing apparatus.

FIG. 1 is a block diagram for explaining an example of the arrangement of a portable information terminal such as a smartphone or portable telephone as an information processing apparatus 115. Referring to FIG. 1, a CPU (Central Processing Unit/Processor) 100 performs various kinds of processing (to be described below) according to a program. There is one CPU 100 in FIG. 1 but a plurality of CPUs or CPU cores may be included. A ROM 101 stores a program to be performed by the CPU 100. A RAM 102 is a memory for temporarily storing various kinds of information at the time of performing the program by the CPU 100.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of performed processing. The display 104 may include a touch sensor 105.

The information processing apparatus 115 may include an internal image capturing device 110. Image data captured by the internal image capturing device 110 undergoes predetermined image processing, and is then saved in the secondary storage device 103. Image data may be loaded from an external image capturing device 111 connected via an external I/F 108.

The information processing apparatus 115 includes an external I/F 109, and can perform communication via a network 113 such as the Internet. The information processing apparatus 115 can acquire, via the external I/F 109, image data from servers 114 connected to the network 113.

The information processing apparatus 115 includes an acceleration sensor 106, and can acquire acceleration information about the position and orientation of the information processing apparatus 115. The information processing apparatus 115 is connected to a printer 112 via an external I/F 107, and can output data such as image data. The printer 112 is also connected to the network 113, and can transmit/receive image data via the external I/F 109.

Each of the external I/Fs 107 to 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC, Bluetooth, infrared communication, or the like is used. If a wireless LAN is used for wireless communication, there are a mode in which apparatuses are directly connected to each other and a mode in which apparatuses are connected to each other via a relay apparatus such as a wireless LAN router. Although the external I/Fs 107 to 109 are arranged separately, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the performing location (software performing environment) of software such as a program performed by the control unit (CPU 100) of the information processing apparatus 115.

<Block Diagram of Software>

Figure 2:
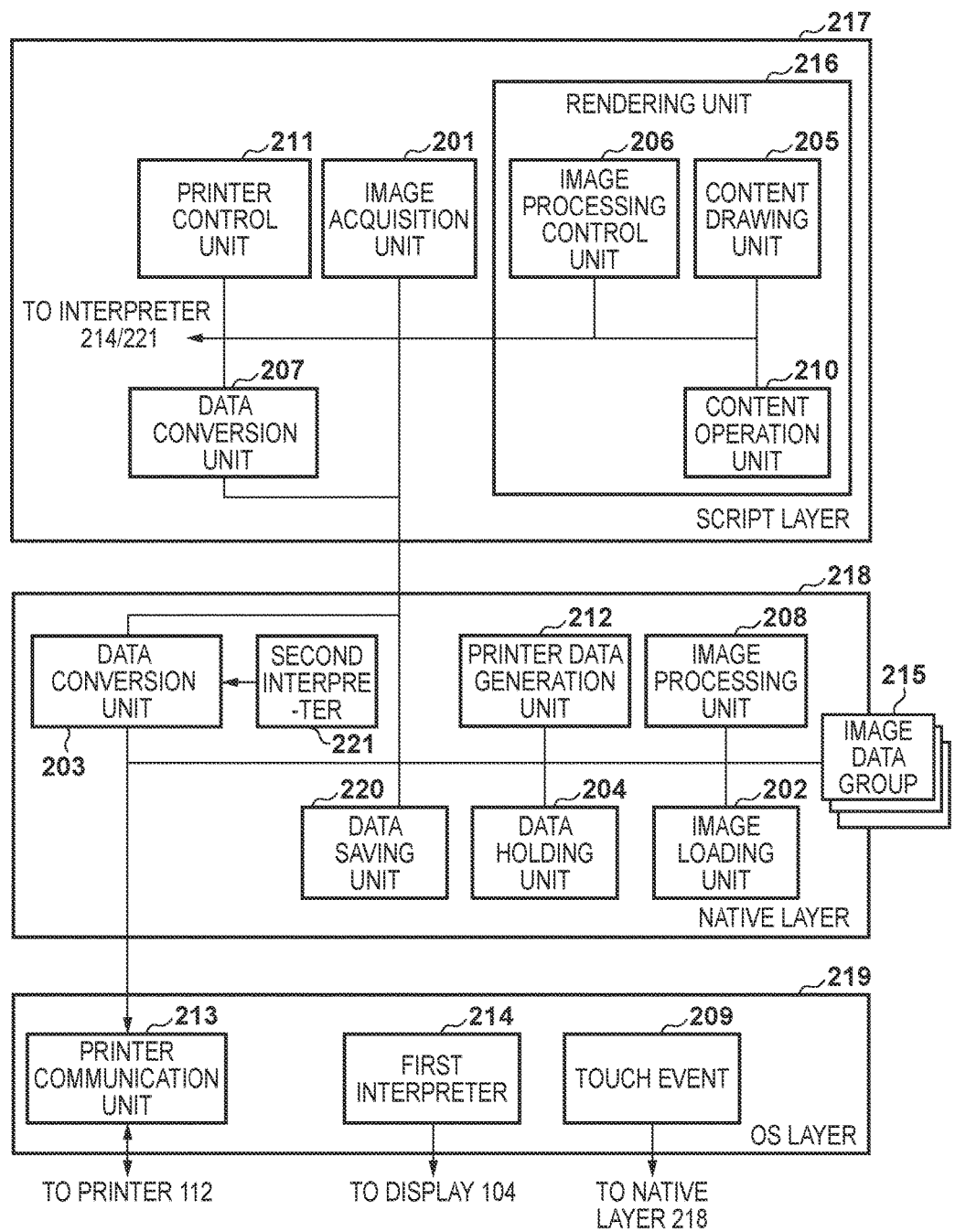
FIG. 2 is a block diagram showing the software arrangement of the information processing apparatus.

FIG. 2 is a block diagram showing the arrangement of software programs operating on the information processing apparatus 115.

The information processing apparatus 115 performs a program of a script layer 217, native layer 218, and OS layer 219. Each layer is implemented when the CPU 100 reads out and performs the corresponding program stored in the ROM 101 or secondary storage device 103.

The script layer 217 is a program layer in which an instruction set (drawing of a content, display of an image, playback of a moving image, and the like) is described by text data using a Web standard language such as HTML5, CSS3, or JavaScript. In this script layer 217, in an application performing environment, various instruction sets of text data are interpreted and performed using a processor (for example, the CPU 100) existing in the application performing environment. For example, there may be a form in which statements are dynamically interpreted line by line every performing operation, a form in which statements are interpreted when activating an application, and a form in which statements are interpreted when installing an application in the information processing apparatus 115.

Processing in the script layer 217 and its contents will be referred to as a script hereinafter. As an example of a form in which the instructions of the script are interpreted in the information processing apparatus 115, the interpreter function included in the native layer 218 or OS layer 219 is used. Note that in this embodiment, most of the UIs of the application are assumed to be described in the script layer 217.

The native layer 218 is a program layer in which an instruction set translated (compiled) in advance in an environment other than the application performing environment is described. In the native layer 218, a code described in a high-level language such as C or C++ is compiled in advance on the server or the PC of the developer of the application into an aggregate of instructions interpretable by the CPU 100. Processing in the native layer 218 and its contents, and calling of a function of the OS layer 219 (to be described later) from the native layer 218 will be referred to as "native" hereinafter. Note that an example of another implementation system of the native layer 218 is Java. Java is a high-level language similar to C/C++, and is compiled in advance into an intermediate code in the development environment at the time of development of the application. The compiled intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of hardware functions to the application. The OS layer 219 includes an API. The function of the OS layer 219 can be used from the script layer 217 and native layer 218.

In this embodiment, allowing calling of the native layer 218 from the script layer 217 will be referred to as "binding" or "bind". The native layer includes an API, and the various functions of the native layer can be used when the API calls the script. In general, this binding function is normally included in each of various OSs.

Note that in this embodiment, the application including the script layer 217 and native layer 218 will be referred to as a hybrid application.

An image acquisition unit 201 of the script layer 217 requests the native layer 218 to acquire image data. At the time of the acquisition request, the image acquisition unit 201 generates a unique ID, and transmits it to the native layer 218. This ID and the image data loaded by an image loading unit 202 of the native layer 218 are stored in a pair in a data holding unit 204 of the native layer 218. In addition, for example, a method of designating an absolute path, a method of prompting display of a dialog, or the like can be used.

The image loading unit 202 of the native layer 218 acquires the image data from an image data group 215. A method of acquiring the image data from the image data group 215 depends on the request of the image acquisition unit 201 of the script layer 217. The request method may be selected from a dialog box provided on the UI, or an image may be directly selected based on the path of a file.

A data conversion unit 203 of the native layer 218 converts data (for example, image data in the binary format) in the native layer 218 into data (for example, image data in the text format (base64)) in a format usable in the script layer 217. On the other hand, the data conversion unit 203 also converts data (for example, image data in the text format (base64)) sent from the script layer 217 into a format (for example, image data in the binary format) usable in the native layer 218.

A data conversion unit 207 of the script layer 217 converts data (for example, a processing parameter in the text format) in the script layer 217 into data (for example, a processing parameter in the text format (JSON format)) in a format usable in the native layer 218. On the other hand, the data conversion unit 207 also converts data sent from the native layer 218 into a format usable in the script layer 217.

The data holding unit 204 of the native layer 218 holds the image data loaded by the image loading unit 202 and image data having undergone image processing by an image processing unit 208. The held image data is rasterized into, for example, an RGB image signal, and has a format in which it is possible to immediately perform image processing. The held image data is paired with the ID generated by the image acquisition unit 201 of the script layer 217. Thus, it is possible to acquire the corresponding image data from the data holding unit 204 by designating the ID.

A content drawing unit 205 of the script layer 217 displays, on the display 104, the image data acquired via the data conversion unit 203 of the native layer 218. The content drawing unit 205 re-draws image data operated by a content operation unit 210. The content operation unit 210 operates the image data in the script layer 217. Examples of this operation are enlargement, movement, and rotation of the image data. The content drawing unit 205 describes a content to be printed by using a Web standard language. The script operated by the content operation unit 210 is also reflected on the description. The script of the content described by the content drawing unit 205 is interpreted by a first interpreter 214 of the OS layer 219, and displayed on the display 104.

An image processing control unit 206 decides a correction parameter to be used for image processing, and requests the image processing unit 208 of the native layer 218 to perform image processing. First, the image processing control unit 206 sets a correction parameter in the script layer 217. In the data conversion unit 207, the set correction parameter is converted into a format transmittable to the native layer 218. The converted correction parameter is then transmitted to the native layer 218 together with the ID of image data to be processed.

The image processing unit 208 of the script layer 217 acquires an image corresponding to the ID designated by the image processing control unit 206 from the data holding unit 204 of the native layer 218, and performs image processing. At this time, image processing to be performed is decided based on the correction parameter set by the image processing control unit 206.

A touch event 209 of the OS layer 219 acquires information about a touch of the display 104. The information about a touch includes, for example, touch detection of the display 104 and touched position information. The acquired information about a touch is transmitted to the content operation unit 210 of the script layer 217 via the native layer 218.

A printer control unit 211 of the script layer 217 controls a rendering start request to a rendering unit 216, a printer detection request, display of a printer setting screen, and generation and transmission of print information. In the printer setting screen, printer settings such as a paper size, paper type, and color/monochrome are made. A printer data generation unit 212 generates printer data based on the items set in the printer setting screen.

Based on the request from the printer control unit 211, the printer data generation unit 212 generates a command and data necessary for printer communication. The data necessary for printer communication is data complying with a communication protocol, and the command is data for deciding the operation of the printer such as printing or scanning.

A printer communication unit 213 of the OS layer 219 transmits the printer data received from the printer data generation unit 212 to the connected printer 112, and receives information about the printer 112 from the printer 112. The first interpreter 214 of the OS layer 219 interprets/performs an instruction generated in the script layer 217. For example, an instruction of drawing an image or the like is performed via the first interpreter 214 and displayed on the display 104.

The native layer 218 includes a second interpreter 221. Although details will be described later, the second interpreter 221 interprets a content drawn in the script layer 217, renders the content to a print resolution, and outputs image data as RGB pixel values.

The image data group 215 is an area which holds image data. A data saving unit 220 saves image data held in the data holding unit 204 in the image data group 215, as needed.

The rendering unit 216 controls the content drawing unit 205, image processing control unit 206, and content operation unit 210 to render the image data to be processed. This rendering operation includes, for example, generation of an image of an output resolution in the script layer 217. At this time, neither the rendering result in the script layer nor the image currently generated in the script layer is displayed on the display 104. The rendering result is transmitted to the data conversion unit 203 of the native layer 218, and converted into image data in a format usable by the printer 112.

<Processing Associated with User Operation>

Figure 3:
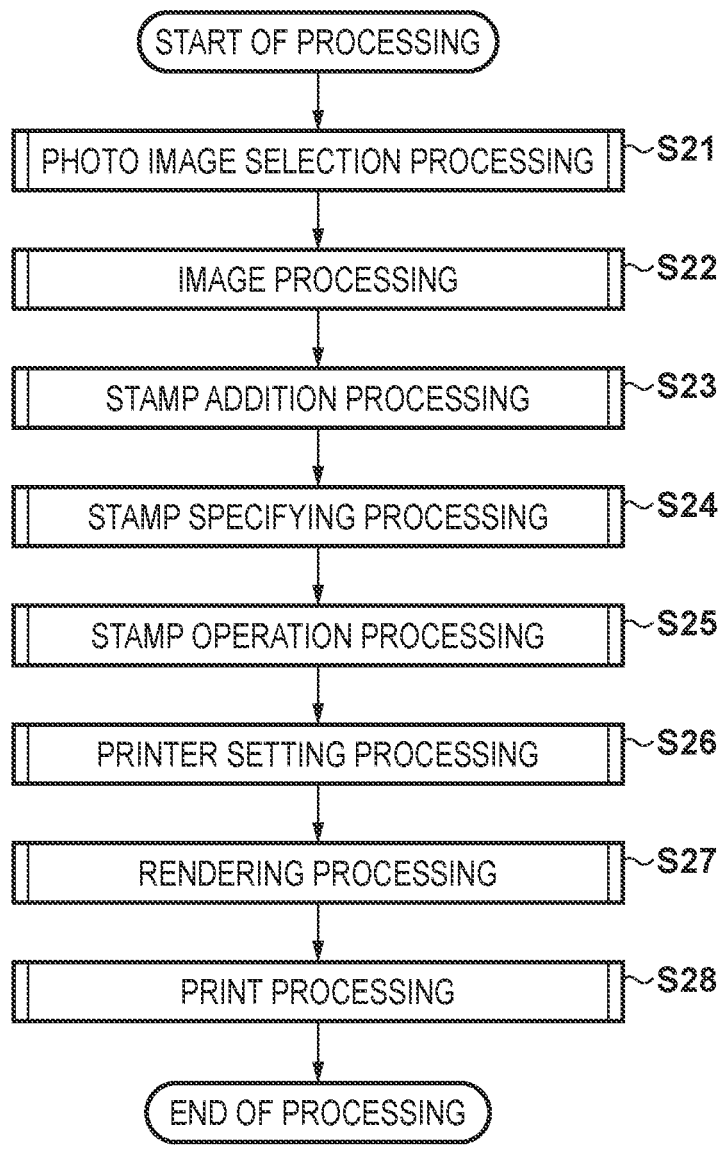
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. Note that the processing in each step of the flowchart is implemented when the CPU 100 of the information processing apparatus 115 performs a program stored in the ROM 101 or secondary storage device 103. Each step shown in FIG. 3 transits according to a user operation on an application screen 1200 as a UI shown in FIG. 12. This application screen 1200 is generated by the script layer 217. An operation on the application screen 1200 is implemented via, for example, the touch sensor 105.

In step S21, upon detecting a user operation (including a touch operation, the same shall apply hereinafter) on a photo image selection button 1201 of the application screen 1200, the CPU 100 selects an arbitrary image in accordance with the operation. After the image is selected, the CPU 100 displays the selected image on an entire rendering region 1206 of the application screen 1200.

In step S22, upon detecting a user operation on a slide bar 1202 for adjusting the luminance of the displayed image, the CPU 100 sets a correction parameter to be used for image processing in accordance with the user operation. The CPU 100 performs the image processing for the displayed image according to the set correction parameter, and displays processing contents and a processing result in the rendering region 1206.

In step S23, upon detecting a user operation on a stamp addition button 1203, the CPU 100 displays a stamp list 1207. Upon detecting selection of a stamp by a user operation on the stamp list 1207, the CPU 100 adds/displays the selected stamp in the rendering region 1206.

In step S24, the CPU 100 specifies a stamp in accordance with a user operation on the application screen 1200. The stamp specifying operation is performed to determine whether the stamp has been touched, based on coordinates touched by the user operation on the display 104 and the coordinates of the stamp. If the stamp has been touched, the stamp is set in an operation acceptance status. In this example, the stamp is set in the operation acceptance status in response to the user operation. The operation acceptance status will be described later.

In step S25, upon detecting a user operation on a slide bar 1204 for rotating the stamp in the operation acceptance status, the CPU 100 rotates the stamp in the operation acceptance status as a stamp operation in accordance with the user operation.

In step S26, upon detecting a user operation on a print button 1205, the CPU 100 displays a setting screen 1301 (FIG. 13) for setting information necessary for printing. The information necessary for printing includes, for example, setting items of a paper size, paper type, print quality, bordered/borderless, as shown in the setting screen 1301 of FIG. 13. In addition, settable setting items such as double-sided/single-sided and monochrome/color are provided depending on the functions of the printer to be used.

In step S27, upon detecting a user operation on a setting completion button 1302 of the setting screen 1301, the CPU 100 performs rendering to convert the image displayed in the rendering region into a print resolution for output to the printer 112.

In step S28, the CPU 100 transmits the image converted into the print resolution to the printer 112 together with a printer control command. With the above processing, the image selected by the user is printed by the printer 112.

Note that the processing shown in FIG. 3 is merely an example. Processing contents are not limited to this, and the processing order of the steps is not limited to this either. In this embodiment, the first program layer including an instruction set to be interpreted and performed by the processor is defined as the script layer 217, and the second program layer including an instruction set compiled in advance by a unit other than the processor is defined as the native layer 218. A program including the first program layer and the second program layer implements a hybrid application. Character string data is defined as the first format and binary data is defined as the second format. Note that the script layer 217 can hold data in the text format, and the native layer 218 can hold data in the binary format.

<Selection of Printer>

First, when an application for implementing the processing shown in FIG. 3 is activated by a user operation, the application performs discovery processing (not shown) of a connectable external device (the printer 112). The discovery processing indicates processing of specifying the IP address of the connectable printer 112 in the network 113 in which the information processing apparatus 115 exists.

The information processing apparatus 115 can transmit an instruction to acquire attribute information of various printers to the IP address (in some cases, a plurality of IP addresses) acquired by the discovery processing, and acquires a reply.

More specifically, in the native layer 218, a command to acquire information of each printer is generated. The command is an instruction to designate the operation of the printer, and is expressed in XML given by:

```
<?xml version="1.0" encoding="utf-8" ?>
<cmd xmlns:trans="http://www.trans/example/">
  <contents>
    <operation>GetInformation</operation>
  </contents>
</cmd>
```

The generated command to acquire printer information is broadcast to network devices (for example, routers connected by Wi-Fi®) on the network in a format complying with the communication protocol of the printer. Note that the command to acquire printer information may be transmitted to only the printer found by the discovery processing. The communication method may be a Wi-Fi Direct mode or a mode of using a telephone line. The present invention, however, is not limited to them. As a result of transmitting the command, the native layer 218 receives a response from the printer. An example of the received response is expressed in XML given by:

```
<?xml version="1.0" encoding="utf-8" ?>
<cmd xmlns:trans="http://www.trans/example/">
  <contents>
    <PrinterName>PrinterA</PrinterName>
    <ImageProcGrp>A</ImageProcGrp>
    <ResolutionX>400</ResolutionX>
    <ResolutionY>400</ResolutionY>
  </contents>
</cmd>
```

Figure 15:
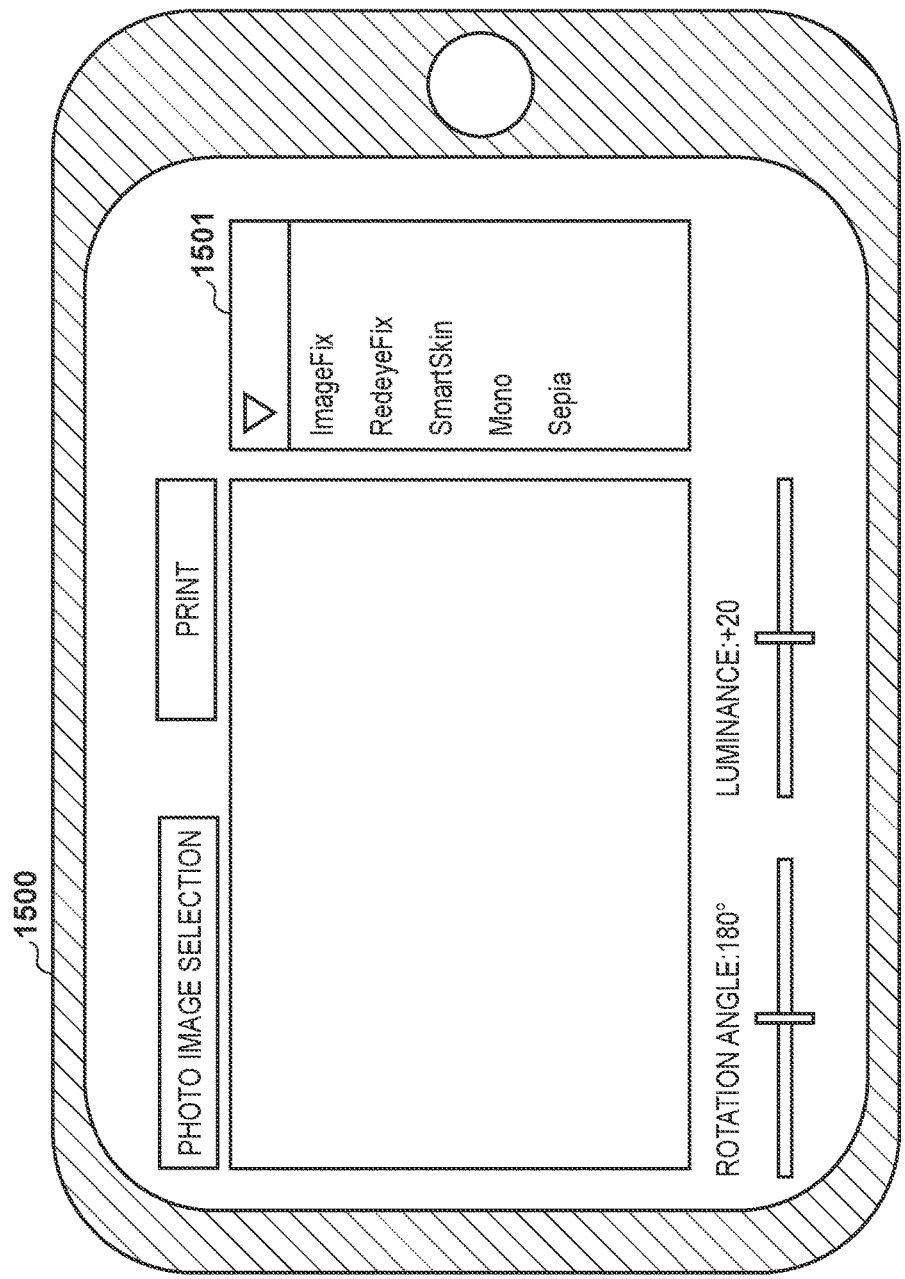
FIG. 15 is a view showing an example of a function selection screen.

The simple example is shown above. By using the PrinterName tag, a printer name can be acquired. In addition, an image processing group usable by each printer can be acquired by the ImageProcGrp tag. Options of a pull-down menu 1501 of the image processing shown in FIG. 15 are decided based on the contents of the image processing group. Note that options of the pull-down menu 1501 of the image processing shown in FIG. 15 may be decided by another method, as will be described later. Also, ResolutionX and ResolutionY are image resolutions needed by the engine of the printer. The unit is, for example, dpi.

The model name acquired in the native layer 218 can be transmitted to the script layer 217, thereby displaying a list of printers by a virtual code given by:

```
<form name="frmPrinter">
  <select name="selPrinter">
  </select>
</form>
<script type="text/javascript">
  Function fAddPrinter(PrinterName, count){
    var
sObj=document.forms["frmPrinter"].elements["selPrinter"]
];
    for (var i=0;i<count;i++){
      var idx=sObj.length;
      sObj.options[idx]=new Option(PrinterName[i]);
    }
  }
</script>
```

The select tag is a description for displaying the list. The JavaScript code described in the script tag allows addition of acquired printer names (which are stored as the PrinterName array) to the list.

Figure 14:
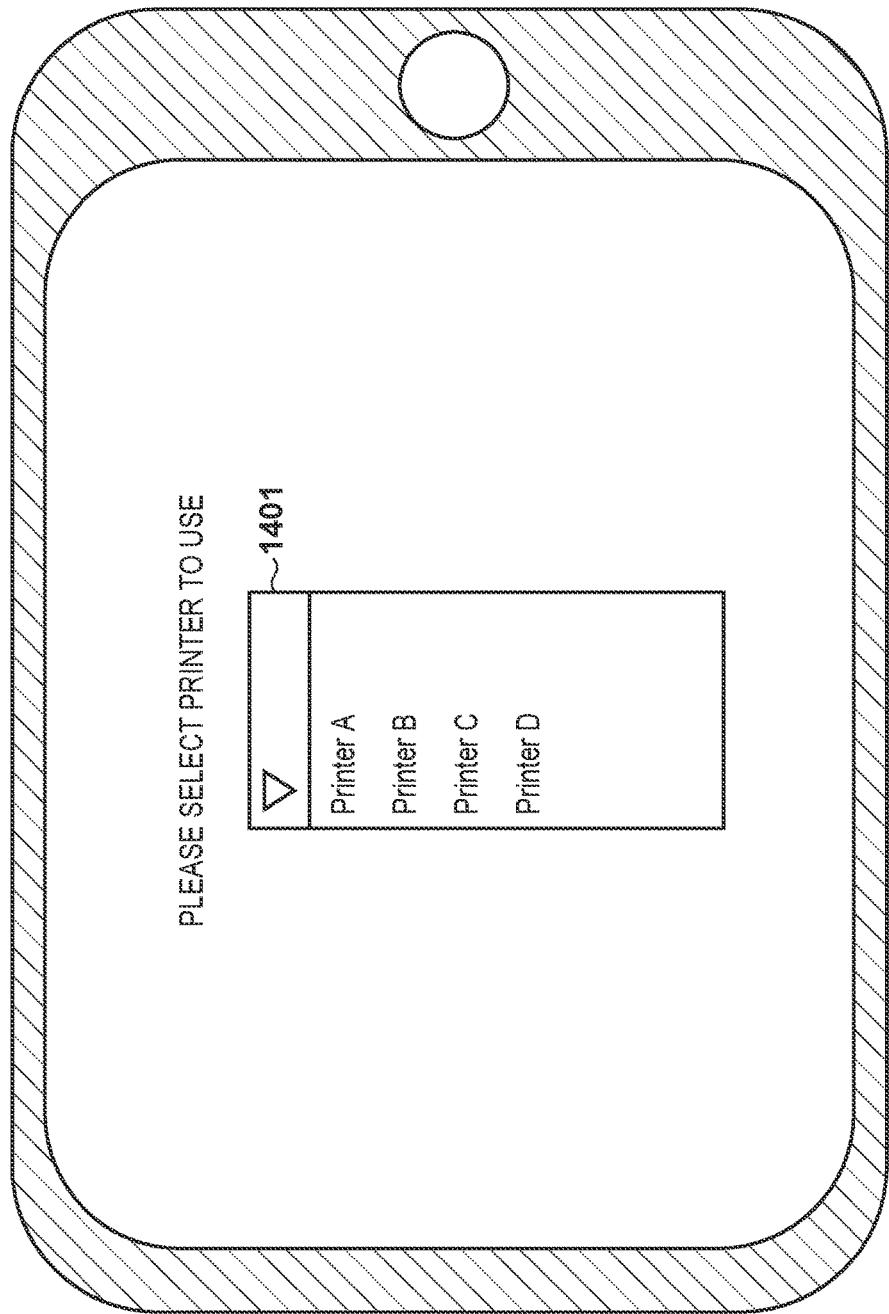
FIG. 14 is a view showing an example of a function selection screen.

FIG. 14 shows a pull-down menu 1401 including the list of printers which is displayed on the display 104 by interpreting, by the first interpreter 214, the virtual code generated in the script layer 217. When the user selects a desired printer, an ID indicating the ordinal number of the list can be acquired. After selecting the printer, the user transits to an operation of selecting a photo image.

<Details of Photo Image Selection Processing>

Figure 4:
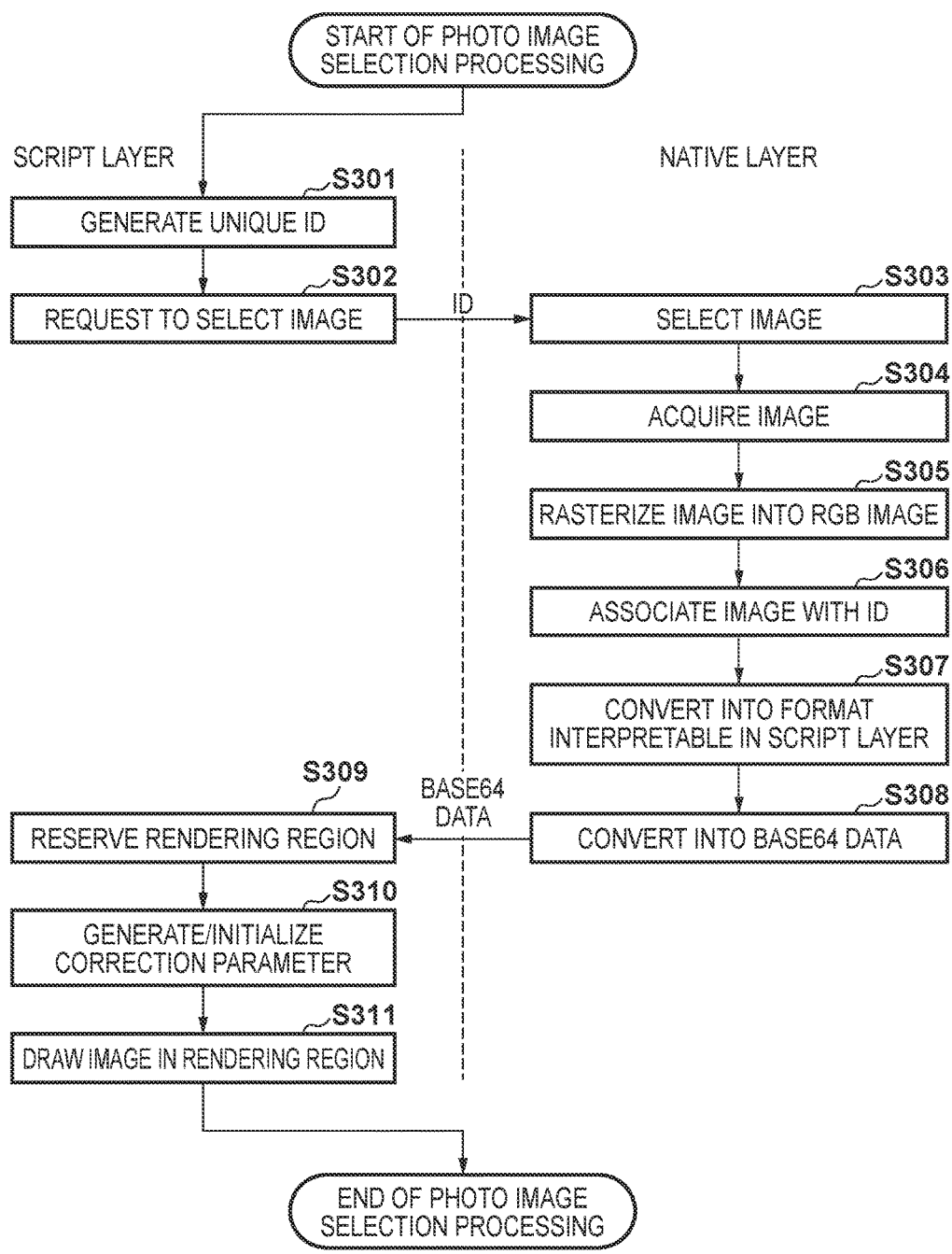
FIG. 4 is a flowchart illustrating details of photo image selection processing.

Details of the photo image selection processing in step S21 of FIG. 3 will be described with reference to FIG. 4. Note that steps S301, S302, and S309 to S311 are processes performed by the CPU 100 using the program of the script layer 217, and steps S303 to S308 are processes performed by the CPU 100 using the program of the native layer 218.

In step S301, the CPU 100 generates a unique ID. This ID may have any form such as a numerical value or character string as long as it can be transmitted from the script layer 217 to the native layer 218. In step S302, the CPU 100 requests the native layer 218 to select an image in accordance with a user operation on the photo image selection button 1201 together with the generated ID. As a request method, the binding function is used to call an image selection API unique to the native layer 218 from the script layer 217. A function capable of being directly called from the script layer 217 or a so-called wrapper of indirectly calling the function is prepared in advance in the native layer 218.

In step S303, the CPU 100 displays a device-specific image selection UI on the display 104. Based on a user operation on the displayed image selection UI, one arbitrary image is selected. In the image selection processing, for example, one image is selected from a folder managed in the information processing apparatus 115. The present invention, however, is not limited to this. For example, an image on the Internet or an image in a detachable storage medium may be selected, or an image shot using the internal image capturing device 110 of the information processing apparatus 115 may be acquired.

In step S304, the CPU 100 acquires the selected image. If, for example, the selected image is in the form of an image file, the CPU 100 opens the file, and reads out its contents. In step S305, the CPU 100 rasterizes the acquired image into an RGB image. In step S306, the CPU 100 holds the rasterized RGB image in the data holding unit 204 in association with the ID acquired from the script layer 217. As an association method, for example, an object having the ID and RGB image is created to make it possible to specify the RGB image by the ID. An association method is not limited to this, and a path as the access destination of the ID and the selected image, a function or that of a class to be performed in accordance with the ID and RGB rasterization, and the like can be used.

In step S307, the CPU 100 converts the rasterized RGB image into data in a format supportable in the script layer 217. In this embodiment, in step S307, the RGB image is converted into data in the JPEG (Joint Photography Expert Group) format. In step S308, the CPU 100 converts the data in the JPEG format into base64 data, and transmits the base64 data to the script layer 217. This is done because the data array of the RGB image cannot be used intact in the script layer 217, and it is thus necessary to convert, in the native layer 218, the data array into a format usable in the script layer 217. Since only a character string can be used in JavaScript®, the base64 format which represents data as a character string is used in this embodiment.

In step S309, the CPU 100 receives the base64 data converted in the native layer 218, and reserves a rendering region for displaying the base64 data in the RAM 102. In this embodiment, as an example of reserving the rendering region, the HTML canvas function is used, and the API of the Context object of a canvas is used to draw an image.

In step S310, the CPU 100 generates and initializes a correction parameter. The correction parameter is an object for holding parameters for deciding contents of the image processing in step S22. An example of the correction parameter held by JavaScript® is:
var CorrectionParam=function( ) {
  this.brightness=0;
}

This correction parameter represents that a variable "brightness" is provided for brightness correction in a CorrectionParam object and a value of 0 is stored.

In this embodiment, for the sake of simplicity, the correction parameter only for brightness (luminance) correction is used. However, parameters (the intensity of a blur filter, ON/OFF of sepia conversion, and the like) for other correction processes may be added.

In step S311, the CPU 100 designates base64 data as data to be drawn in the rendering region, thereby drawing an image in the rendering region according to the designation. More specifically, the first interpreter 214 interprets the script of the base64 data, and displays it as an image in the rendering region. An example of a sample code of reflecting the base64 data on the rendering region is:

```
var base64Data = base64 data from native layer
var canvas = document.createElement("canvas");
//reserve the rendering region of an image
canvas.setAttribute("width", 100);    //set the
size of the rendering region
canvas.setAttribute("height", 100);
var context = canvas.getContext("2d");   //generate an
object having an API to be drawn in the rendering
region
var img = new Image( );     //generate an Image object
img.src = base64Data;     //set the received base64
data as the URI of the image
img.onload = function( ){   //start processing after the
end of loading of the image
context.drawImage(img, 0, 0, img.width, img.height, 0,
0, canvas.width, canvas.height);   //draw the image in
the rendering region using a method of a context object
```

```
document.getElementById("div").appendChild(canvas);
//This flowchart assumes a layer structure of many
canvases. These canvases do not freely exist
everywhere, and drawing, moving, and enlargement
operations are performed within a specific region (the
rendering region 1206 of FIG. 12). The region is
designated by "div", and each canvas is added to "div".
}
```

<Details of Image Processing>

Details of the image processing in step S22 of FIG. 3 will be described with reference to FIG. 5. Note that steps S401 to S403, S409, and S411 are processes performed by the CPU 100 using the program of the script layer 217, and steps S404 to S408 and S410 are processes performed by the CPU 100 using the program of the native layer 218.

In step S401, the CPU 100 sets the correction parameter. In this example, the CPU 100 updates the value of "brightness" of the correction parameter generated in step S310 of FIG. 3 by a value set in accordance with a user operation on the slide bar 1202. In step S402, in the script layer 217, the CPU 100 activates an indicator, and displays it on the display 104. That is, when the user instructs the performance of image processing, the indicator is activated. The indicator is displayed to notify the user that the processing is in progress, and is generally represented by a progress bar, a clock mark, or an index image such as flickering or rotation of a figure. FIG. 21 shows an example of the index image.

The indicator according to this embodiment is displayed on the display 104 as an image icon representing an operation status during the image processing by, for example, the following script. Note that a predetermined image such as animation incorporated in the OS may be used as the indicator. An example of the script for displaying an image icon during the processing is:

```
<html>
<header>
  <h2>ImageProcess</h2>
    <img src = "path/sunadokei.jpg" id="sunadokei">
  <script>
  function removeSunadokei( ){
    var sunadokei =
document.getElementById("sunadokei");
    var parent = sunakei.parentNode;
    parent.removeChild("sunadokei");
  }
  </script>
</header>
</html>
```

It is possible to control display of the icon during the processing while performing the image processing by removing the image icon during the processing at the end of the image processing by JavaScript.

In step S403, the CPU 100 converts the set correction parameter into a format usable in the native layer 218. In this example, the correction parameter is in the form of an object, and cannot be used intact in the native layer 218. Thus, the CPU 100 converts the set correction parameter into a JSON character string. The CPU 100 transmits the correction parameter converted into the JSON character string to the native layer 218 together with the ID generated in step S301 of FIG. 3.

In step S404, the CPU 100 decodes the correction parameter converted into the JSON character string, thereby acquiring the correction parameter. More specifically, the correction parameter is parsed using a parser included in the OS layer 219. In the above example, after the parsing processing, "brightness" of the correction parameter is acquired.

In step S405, the CPU 100 specifies the RGB image rasterized in step S305 of FIG. 3 based on the ID acquired from the script layer 217. Note that association between the ID and the image is not limited to paring the ID and the RGB image, as described above. For example, a method of associating the path of the image with the ID may be used. There are various examples to be associated with the ID, such as an object of the native layer 218, the first address of image data, and a function of calling the image.

In step S406, the CPU 100 determines, based on the acquired correction parameter, image processing to be performed, and performs the image processing for the RGB image specified in step S405. In this embodiment, a value of 10 is added to the R, G, and B values of all pixels according to the brightness correction parameter.

In step S407, the CPU 100 converts the RGB image having undergone the image processing into data in a format supportable in the script layer 217. In this example, the CPU 100 converts the RGB image into data in the JPEG format, similarly to step S307 of FIG. 3. In step S408, the CPU 100 requests the script layer 217 to stop the indicator. This is implemented by calling an indicator stop function defined in the script layer 217 from the native layer 218.

In step S409, the CPU 100 stops the indicator, and removes the indicator from the display 104.

On the other hand, in step S410, the CPU 100 converts the converted data in the JPEG format into base64 data, and transmits the base64 data to the script layer 217.

In step S411, the CPU 100 receives the base64 data converted in the native layer 218, and draws an image in the rendering region reserved in step S309 of FIG. 3 in accordance with the base64 data. When this image is interpreted in the OS layer 219, it is displayed in the designated display region.

In selection of an image processing function, in this embodiment, as shown in FIG. 15, a list of usable image processing functions is displayed in a function selection screen 1500 including a pull-down menu 1501, and then the user can select desired processing.

In the pull-down menu 1401, "ImageFix" indicates a function (face detection function) of automatically analyzing a photo image using a human face detection or scene analysis unit, and performing appropriate brightness/white balance adjustment (see Japanese Patent Laid-Open No. 2010-278708), "RedeyeFix" indicates a function (red eye detection function) of automatically detecting a red eye image from images and correcting it (see Japanese Patent Laid-Open No. 2006-350557), "SmartSkin" indicates a function of detecting a human face from a photo image, and processing the skin region of the face (see Japanese Patent Laid-Open No. 2010-10938), "Mono" indicates a monochromatic processing function of performing known monochrome conversion, and "Sepia" indicates a sepia processing function of performing known sepia conversion. Note that the types of image processing functions are not limited to those shown in FIG. 15, and various kinds of image processing can be used in accordance with the application and purpose.

At this time, in this embodiment, a system function normally provided in the OS layer 219 is called from JavaScript by the binding function. Device attribute information as attribute information of the information processing apparatus 115 is acquired from the system function. Note that the device attribute information is information about each of terminal apparatuses (information processing apparatus 115) of different performances on which the application operates and the operation status of the terminal apparatus.

In this embodiment, the information processing apparatus 115 acquires a clock rate Clk [MHz] of the CPU 100 of itself as the device attribute information. An image processing group including usable image processing functions is specified based on the clock rate Clk using a predetermined threshold Th1. A virtual code to specify the image processing group is given by:

If (Clk>Th1) ImageProcGrp="A";
   Else ImageProcGrp="B"

Note that this determination processing is generally performed in the script layer 217 when the application is activated. If the image processing group can be specified, a usable image processing display script is controlled in the script layer 217 by:

```
<form name="frmIProc">
    <select name="selIProc">
    </select>
</form>
<script type="text/javascript">
    Function fAddImageProc(Grp){
        var sObj=document.forms["frmIProc"].elements["selIProc"];
        if(Grp ="A"){
            var idx=sObj.length;
            sObj.options[idx]=new Option("ImageFix");
            var idx=sObj.length;
            sObj.options[idx]=new Option("RedEyeFix");
            var idx=sObj.length;
            sObj.options[idx]=new Option("SmartSkin");
            var idx=sObj.length;
            sObj.options[idx]=new Option("Mono");
            var idx=sObj.length;
            sObj.options[idx]=new Option("Sepia");
        }
        Else if (Grp="B"){
            var idx=sObj.length;
            sObj.options[idx]=new Option("Mono");
            var idx=sObj.length;
            sObj.options[idx]=new Option("Sepia");
        }
    }
</script>
```

In the above script operation, if it is determined that the clock rate of the CPU 100 of the information processing apparatus 115 is larger than a predetermined value (threshold), and complex image processing is performable (Grp=A), more image processing functions can be selected. On the other hand, if the clock rate of the CPU 100 of the information processing apparatus 115 is equal to or smaller than the predetermined value, only processing such as monochrome conversion or sepia conversion of light processing load can be selected.

The script is interpreted by the first interpreter 214 shown in FIG. 2 and drawn on the display 104.

When the user selects a desired image processing function, it is possible to discriminate an image processing ID for identifying the selected image processing function by using an HTML function. This image processing ID is transmitted to the native layer 218, and the image processing unit 208 applies image processing corresponding to the selected image processing function. Note that a detailed description of each image process will be omitted.

The script shows an example in which image processes selectable by the user are narrowed down and displayed by excluding image processing inappropriate for the performance of the information processing apparatus 115. Note that a display method is not limited to this. For example, although image processing inappropriate for the performance of the information processing apparatus 115 is selectably displayed, a warning document or a display item such as a warning mark may be displayed to warn the user that the processing may be slowed down. The display item or warning document may be displayed before the user selects the image processing or displayed in response to a selection operation by the user.

Furthermore, if, for example, a program necessary for specific image processing is not installed, image processing which cannot be performed by the information processing apparatus 115 may be excluded from options for the user, and a warning may be given for image processing inappropriate for the information processing apparatus 115.

Furthermore, the image processing selection screen may be controlled in accordance with the status of the information processing apparatus 115 instead of the performance of the information processing apparatus 115. Alternatively, the selection screen may be controlled based on both the performance and status of the information processing apparatus 115. The status of the information processing apparatus 115 will be described later in the fifth embodiment.

Note that the performance or status of the information processing apparatus 115 is acquired when the user instructs to start selection of an image processing function. The performance of the information processing apparatus 115 may be acquired in advance before the instruction. However, as for the "status", newer information allows more appropriate display control. Therefore, the status of the information processing apparatus 115 is acquired at the start of selection of an image processing function.

<Details of Stamp Addition Processing>

Figure 6:
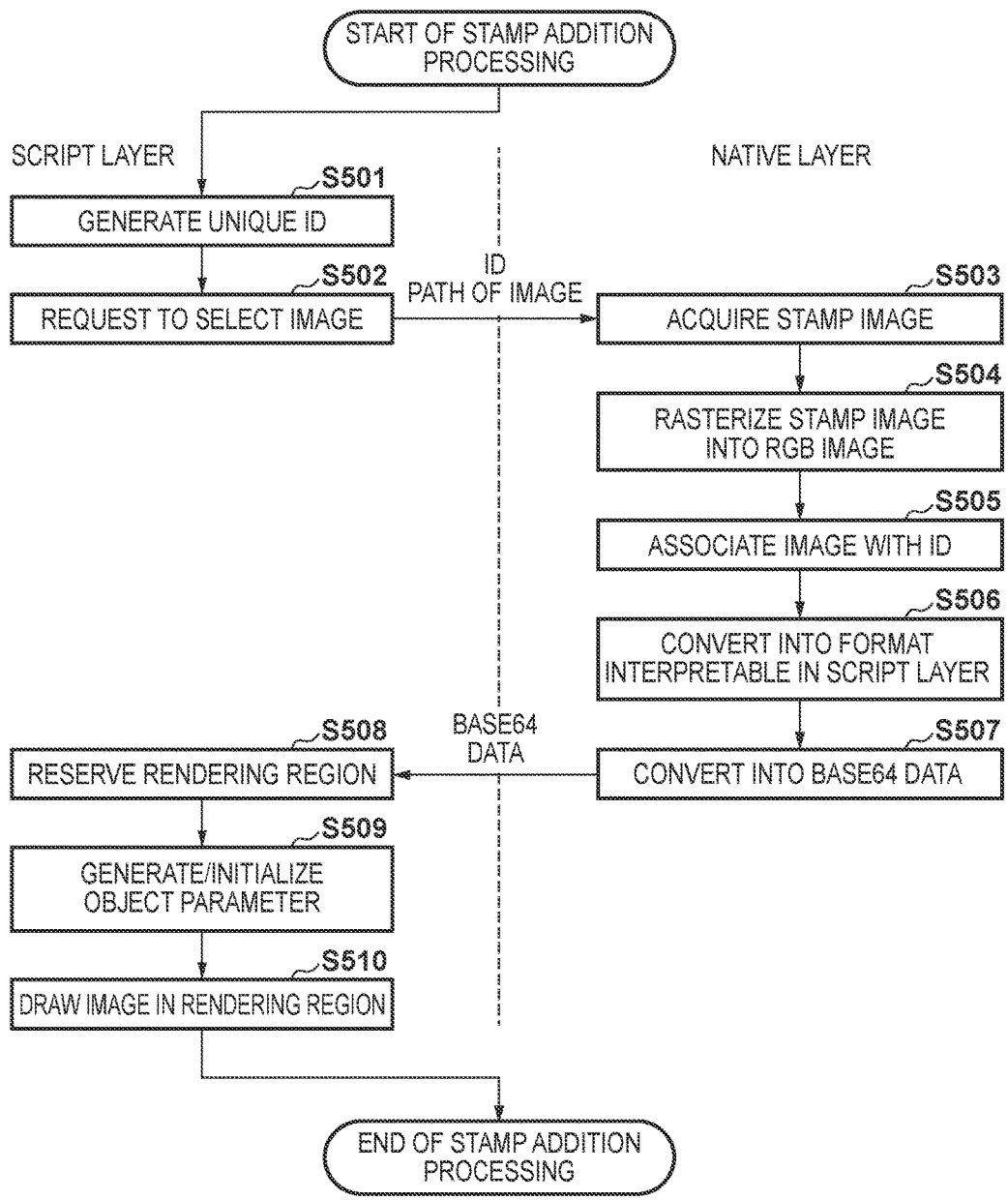
FIG. 6 is a flowchart illustrating details of stamp addition processing.
Figure 12:
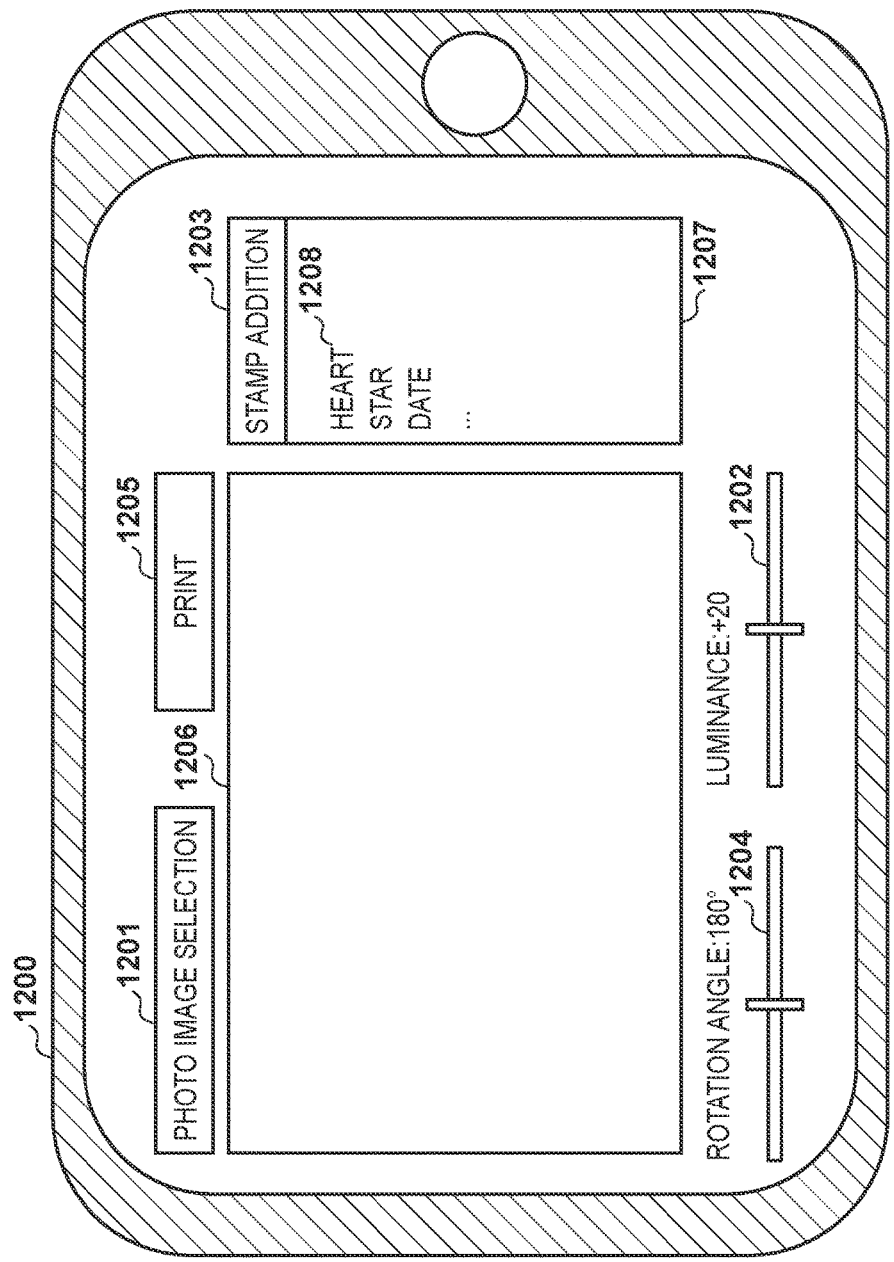
FIG. 12 is a view showing an example of an application screen.

Details of the stamp addition processing in step S23 of FIG. 3 will be described with reference to FIG. 6. In this example, a case in which a heart stamp 1208 is selected after the stamp addition button 1203 of the application screen 1200 shown in FIG. 12 is pressed by a user operation and the stamp list is displayed will be exemplified. Note that steps S501, S502, and S508 to S510 are processes performed by the CPU 100 using the program of the script layer 217, and steps S503 to S507 are processes performed by the CPU 100 using the program of the native layer 218.

In step S501, the CPU 100 generates a unique ID. This ID has the same characteristic as that of the ID generated in step S301 of FIG. 3. In step S502, the CPU 100 transmits the access destination (absolute path) of an image to be used as a stamp to the native layer 218 together with the ID generated in step S501, thereby requesting to select the stamp image corresponding to the stamp.

In step S503, the CPU 100 acquires the stamp image using the absolute path of the stamp image received from the script layer 217 and a device-specific image selection API. In step S504, the CPU 100 rasterizes the acquired stamp image into an RGB image. In step S505, the CPU 100 holds the rasterized RGB image in the data holding unit 204 in association with the ID acquired from the script layer 217. An association method is the same as that in step S306 of FIG. 3. In step S506, the CPU 100 converts the rasterized RGB image into data in a format supportable in the script layer 217. In this conversion processing, the CPU 100 converts the RGB image into data in the JPEG format, similarly to step S307 of FIG. 3. In step S507, the CPU 100 converts the data in the JPEG format into base64 data, and transmits the base64 data to the script layer 217.

In step S508, the CPU 100 receives the base64 data converted in the native layer 218, and reserves a rendering region for displaying the base64 data in the RAM 102. In step S509, the CPU 100 generates and initializes an object parameter. Note that the object parameter is an object for holding parameters to be used, at the time of the rendering processing in step S27 of FIG. 3, to decide the rotation angle of the stamp after the rendering processing. An example of the object parameter held by JavaScript® is:

```
var ObjectParam = function( ){
    this.theta = 0;
    this.posX = 0;
    this.posY = 0;
    this.width = 100;
    this.height = 100;
}
```

This object parameter represents that a variable "theta" indicating the rotation angle is provided in an ObjectParam object and a value of 0 is stored in "theta". Similarly, "posX" represents an x-coordinate when the upper left corner of the rendering region is set as a reference point, "posY" represents a y-coordinate when the upper left corner of the rendering region is set as a reference point, "width" represents the lateral width of the rendering region, and "height" represents the longitudinal width of the rendering region. Note that the object parameter is minimized in this embodiment for the sake of simplicity. However, it is apparent that other parameters (translation amount, enlargement magnification, and the like) can be added and used at the time of drawing or rendering.

In step S510, the CPU 100 displays the base64 data as an image in the rendering region 1206 based on the generated object parameter. More specifically, the CPU 100 transmits the base64 data corresponding to the selected stamp to the first interpreter 214 of the OS layer 219. The first interpreter 214 interprets the script of the base64 data, and displays it as a stamp image in the rendering region. Note that one stamp is selected in this embodiment for the sake of simplicity. However, a plurality of stamps can be selected. In addition, an image prepared in advance is used as a stamp in this embodiment. However, a method of generating, in the script layer, an object to be drawn by using a Context object may be used.

<Details of Stamp Specifying Processing>

Figure 7:
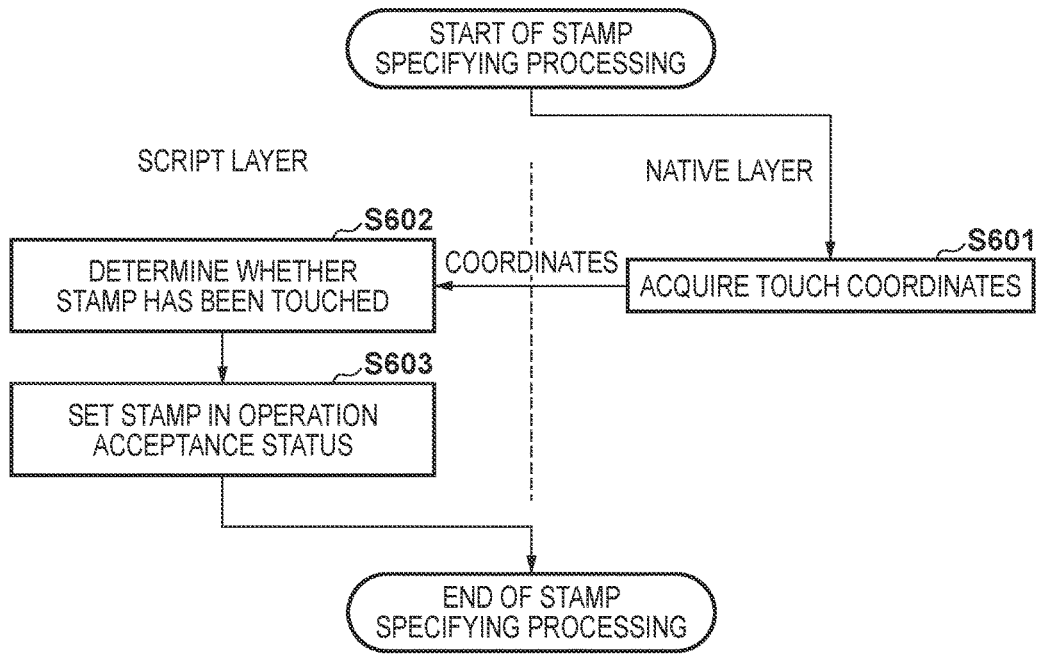
FIG. 7 is a flowchart illustrating details of stamp specifying processing.

Details of the stamp specifying processing in step S24 of FIG. 3 will be described with reference to FIG. 7. Note that steps S602 and S603 are processes performed by the CPU 100 using the program of the script layer 217, and step S601 is a process performed by the CPU 100 using the program of the native layer 218.

In step S601, the CPU 100 acquires coordinates touched on the display 104, and transmits them to the script layer 217.

Figure 5:
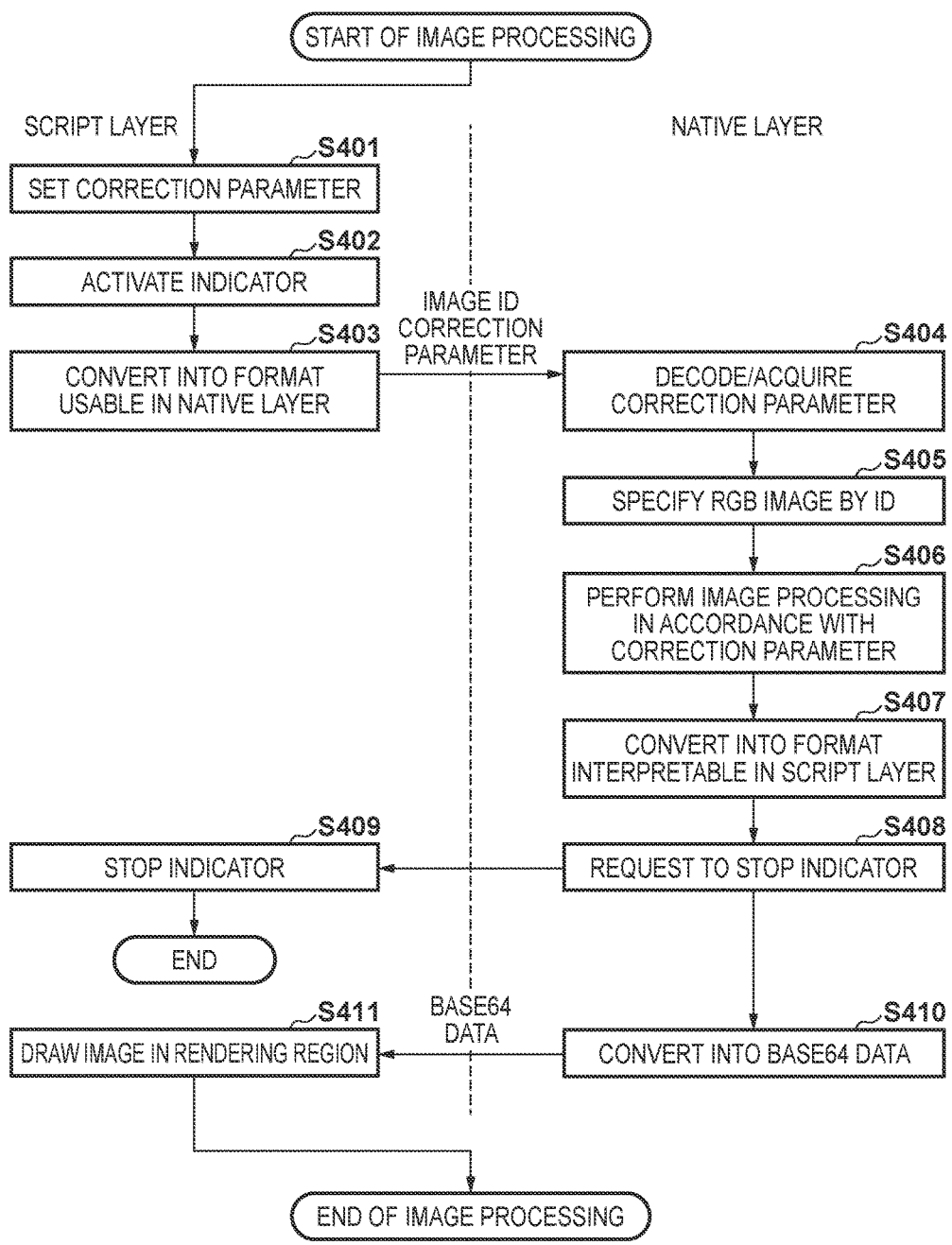
FIG. 5 is a flowchart illustrating details of image processing.

In step S602, the CPU 100 determines whether the stamp added in step S23 of FIG. 3 has been touched, based on the coordinates received from the native layer 218 and information of the object parameter generated in step S509 of FIG. 5. In the added stamp, the object parameter includes the initial values. Therefore, according to the above example of the object parameter, the stamp is drawn in a region of 100 in the x direction and 100 in the y direction with reference to (0, 0) set at the upper left corner of the rendering region 1206. If, therefore, a value obtained by subtracting the x-coordinate of the rendering region 1206 from the x-coordinate of the received coordinates (x, y) falls within the range from 0 to 100, and a value obtained by subtracting the y-coordinate of the rendering region 1206 from the y-coordinate of the received coordinates (x, y) falls within the range from 0 to 100, it can be determined that the stamp has been touched. If it is determined that the stamp has been touched, the stamp is set in the operation acceptance status. The following description will be provided by assuming that the stamp added in step S23 has been touched.

In step S603, the CPU 100 sets the stamp in the operation acceptance status in accordance with the determination result. Setting the stamp in the operation acceptance status is equivalent to temporarily recording the ID of the touched stamp as a stamp ID of interest in the script layer 217. Since images and IDs are stored in pairs in the data holding unit 204, if only an ID is grasped, it is possible to specify a unique image.

<Details of Stamp Operation Processing>

Figure 8:
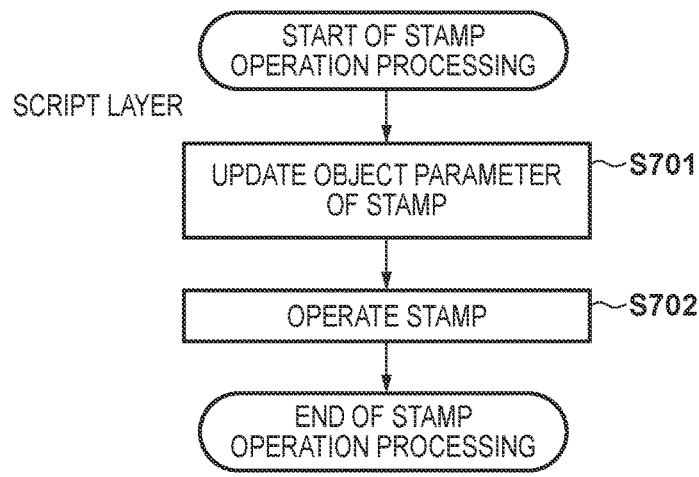
FIG. 8 is a flowchart illustrating details of stamp operation processing.

Details of the stamp operation processing in step S25 of FIG. 3 will be described with reference to FIG. 8. Note that each step of FIG. 8 is a process performed by the CPU 100 using the program of the script layer 217.

In step S701, the CPU 100 updates the value of "rotate" of the object parameter of the stamp. For example, the CPU 100 updates the value by a value set using the slide bar 1204 of FIG. 12. In step S702, the CPU 100 re-draws the stamp set in the operation acceptance status in step S603 of FIG. 7 in the rendering region 1206 by using the object parameter. If, for example, the stamp image is drawn in an HTML canvas, it is possible to rotate the image in the canvas by using the rotate method of the Context object of the canvas.

Note that an operation of the stamp is only rotation in this embodiment. However, other operations such as enlargement/reduction and translation may be possible. It is also apparent that if a photo image has an object parameter, the same operation as the stamp operation is possible.

<Details of Printer Setting Processing>

Details of the printer setting processing in step S26 of FIG. 3 will be described with reference to FIG. 9. Note that steps S801 and S807 to S809 are processes performed by the CPU 100 using the program of the script layer 217, and steps S802 to S806 and S810 are processes performed by the CPU 100 using the program of the native layer 218.

In step S801, in the script layer 217, the CPU 100 requests the native layer 218 to acquire printer information as device information. This is equivalent to a request from the script layer 217 for communicating with the printer 112. As a request method, an API unique to the native layer is called from the script layer by using the binding function, similarly to the image selection processing. A function capable of being directly called from the script layer 217 or a so-called wrapper of indirectly calling the function is prepared in advance in the native layer 218. For example, a native function GetPrinterInfo is prepared, and called from the script side. In this way, the native layer acquires a request to communicate with an external device from the script layer.

In general, it is impossible to directly communicate with an external device from the script layer 217 under the security restrictions. Therefore, as described above, the script layer 217 requests the native layer 218 to acquire external device information, and then communicates with an external device via the native layer 218. The native layer 218 has a function of communicating with an external device (for example, the printer 112) via the OS layer 219.

In step S802, the CPU 100 calls a function for acquiring the printer information in accordance with the request from the script layer 217, and performs detection of a printer, that is, so-called discovery. As an example of a detection method, a printer connected via the same wireless LAN router is detected. In this example, since detection of a communicable printer is performed, the CPU 100 requests a response by a broadcast or multicast method by a protocol such as Bonjour, and stands by for a response from a printer, thereby detecting the printer.

In step S803, the CPU 100 stores an IP address included in the response from the printer 112. In step S804, the CPU 100 transmits a printer information acquisition command as a device information acquisition command to the printer 112 corresponding to the stored IP address. If there are a plurality of printers 112 which have responded, the CPU 100 transmits the printer information acquisition command to each of all the printers 112. The printer information acquisition command is an instruction to designate the operation of the printer, and its example is expressed in XML given by:

```
01:  <?xml version="1.0" encoding="utf-8" ?>
02:  <cmd xmlns:trans="http://www.xxxx/yyyyy/">
03:    <contents>
04:      <operation>GetInformation</operation>
05:    </contents>
06:  </cmd>
```

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetInformation" is an instruction of acquiring information of a printer as an external device. For example, it is requested to provide capability information such as a paper type, a size, the presence/absence of a borderless print function, and the print quality supported by the printer.

Note that a printer information acquisition command may be generated by, for example, loading permanent text stored in advance in the ROM 101. Also, the format is not limited to the text format such as XML, and the command may be described in the binary format, and communicated by a protocol complying with the format. The generated printer information acquisition command is transmitted to the printer 112 via the printer communication unit 213 in a format complying with a communication protocol such as HTTP or IPP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 9:
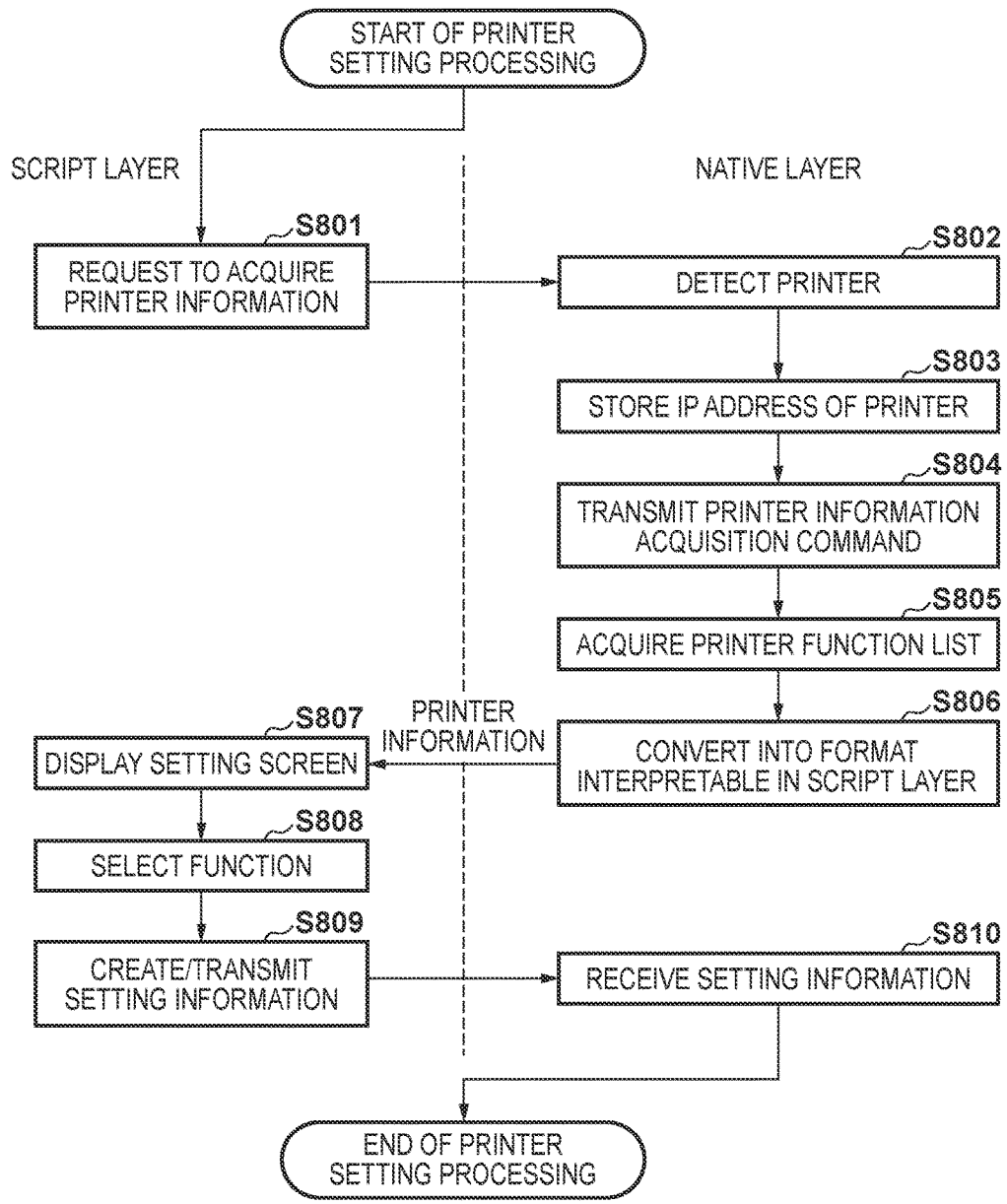
FIG. 9 is a flowchart illustrating details of stamp setting processing.

Referring to FIG. 9, a printer information acquisition command is generated in the native layer 218. However, even if a printer information acquisition command is generated in the script layer 217, it is possible to obtain the same effects. In this case, a printer information acquisition command including the above statement in the XML format is created in the script layer 217, and transferred to the native layer 218. Upon receiving the statement, the native layer 218 transmits the printer information acquisition command to the printer 112 in a format complying with a communication protocol.

Upon receiving the printer information acquisition command from the information processing apparatus 115, the printer 112 transmits the printer information as device information in the XML format to the information processing apparatus 115 according to the communication protocol. An example of the printer information is given by:

```
01:   <?xml version="1.0" encoding="utf-8" ?>
02:   <cmd xmlns:trans="http://www.xxxx/yyyyy/">
03:     <contents>
04:       <device id="Printer001" />
05:       <mode = 1>
06:         <media>GlossyPaper</media>
07:         <size>A4</size>
08:         <quality>1</quality>
09:         <border>no</border>
10:       </mode>
11:       <mode = 2>
                ...
              </mode>
              <mode = 3>
                ...
              </mode>
              ...
          </contents>
        </cmd>
```

The first line indicates a header representing that the information is described in the XML format.

On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>.

The fourth line indicates a device ID. In this example, the model name of the printer 112 is "Printer001".

On the fifth line and subsequent lines, the respective modes of the printer 112 are described. Information in one mode is described between <mode> and </mode>. On the fifth line, the number of a mode is 1. After that, <media> describes the type of printing paper, <size> describes a paper size, <quality> describes the print quality, and <border> describes bordered/borderless information.

On the 11th line and subsequent lines, information about mode 2 as another mode is described. In this way, the model name of the printer 112 and all the modes supported by the printer are described in the XML data.

Note that a method of describing printer information is not limited to this. The printer information may be described in another format such as a binary format or a text format which is not a tag format. In the above example, the information of the print function of the printer is transferred. However, the present invention is not limited to this. For example, information about image processing and analysis processing processable by the printer, the presence/absence of a silent mode, the presence/absence of the use of a memory card, and a status such as the remaining ink amount may be transferred. Examples of image processing are color conversion such as monochrome conversion, sepia conversion, and chroma enhancement, multiple image layout, white balance correction, noise removal, and processing of automatically correcting a photo to preferable colors and brightness.

In step S805, the CPU 100 receives the printer information from the printer 112, and acquires the function list of the printer 112 from the received printer information. For example, the CPU 100 acquires a printer function list including terms of the type and size of printing paper, the print quality, and bordered/borderless and a term count in each of all the modes of the printer 112.

In step S806, the CPU 100 converts the received printer information about the acquired printer function list into a format interpretable in the script layer 217, and transmits the converted information to the script layer 217. That is, the information obtained by communication with the printer 112 is transferred to the script layer 217. More specifically, the binding function is used to transmit the printer information about the printer function list from the native layer 218 to the script layer 217. The native function is called from the script layer 217, and the information is transferred as a return value. By setting a mode to be acquired or the like as an argument, the script layer 217 may receive the return value of the mode. As another example, there is a method of transmitting the received printer information in the XML format, or transmitting the printer information by converting it in a text format without any tag. In addition, the information may be transferred by using the above-described JSON character string, or transferred by a character string such as base64 by using the data conversion units 207 and 203.

In step S807, the CPU 100 forms a setting screen (FIG. 13) including functions usable by the printer 112 based on the printer information received from the native layer 218, and displays the setting screen. In this embodiment, this is called display control. In this embodiment, the printer is selected first. However, if there are a plurality of connectable printers, the CPU 100 generates, at this timing, a display screen for displaying printer names and prompting the user to select a printer for printing (display contents are controlled). Note that a printer selection method is not limited to this, and a method of selecting a printer which responds earliest, a method of selecting a printer having more functions, a method of selecting a printer with not so many print jobs, or the like may be used.

As described above, the CPU 100 displays the setting screen 1301 (FIG. 13) for prompting the user to select functions usable by the printer, such as the type and size of printing paper, the print quality, and bordered/borderless. As an example of a method of forming a setting screen, a sample of an HTML description is given by:

```
<!DOCTYPE html>
  <head>
    <title>print setting</title>
    <script>
      <!-- paper size -->
      var PaperSizeNum = GetPaperSizeNum( );
      var p = document.getElementById("PaperList");
      var i;
      for(i=0; i<PaperSizeNum; i++){
        p.options[i] = new Option(GetPaperSizeT(i), GetPaperSizeV(i));
      }
      <!-- paper type -->
      var MediaTypeNum = GetMediaTypeNum( );
      var m = document.getElementById("MediaList");
      var j;
      for(j=0; j<MediaTypeNum; j++){
        m.options[i] = new Option(GetMediaTypeT(j),
```

```
    GetMediaTypeV(j));
    }
    <!-- print quality -->
    var QualityNum = GetQualityNum( );
    var q = document.getElementById("QualityList");
    var k;
    for(k=0; k< QualityNum; k++){
        q.options[i] = new Option(GetQualityT(k),
GetQualityV(k));
    }
    <!-- bordered/borderless -->
    var BorderNum = GetBorderNum( );
    var b = document.getElementById("BorderList");
    var l;
    for(l=0; l<BorderNum; l++){
        b.options[i] = new Option(GetBorderT(l),
GetBorderV(l));
    }
    <!-- print function -->
    function printer( ) {
    SetPrint(document.getElementById("PaperList").value,
            document.getElementById("MediaList").value,
            document.getElementById("QualityList").value,
            document.getElementById("BorderList").value);
    }
    </script>
    </head>
    <!-- display unit -->
    <body>
    paper size <select id="PaperList"></select><br/>
    paper type <select id="MediaList"></select><br/>
    print quality <select
id="QualityList"></select><br/>
    bordered/borderless <select
id="BorderList"></select><br/>
    <br/>
    <button id="btn1" onclick="printer( )">setting
completion</button>
    </body>
    </html>
```

In the above sample, GetPaperSizeNum( ), GetMediaTypeNum( ), GetQualityNum( ), and GetBorderNum( ) are native functions, and each native function has a function of acquiring an item count. For example, paper sizes supported by the printer are A4, A5, B5, and L size, GetPaperSizeNum( ) returns 4.

Also, GetPaperSizeT(n), GetMediaTypeT(n), GetQualityT(n), and GetBorderT(n) are native functions, and each function returns the nth character string. For example, the return value of GetPaperSizeT(0) as a function of returning text of the paper size is "A4", and the return value of GetPaperSizeT(1) is "A5". These values are extracted by the native function from the printer information received from the printer.

Furthermore, GetPaperSizeV(n), GetMediaTypeV(n), GetQualityV(n), and GetBorderV(n) are native functions, and each function returns a value corresponding to the value of the argument n. For example, the return value of GetMediaTypeT(0) as a function of returning text of the paper type is "glossy paper" as a word displayed and presented to the user. On the other hand, the return value of GetMediaTypeV (0) is "GlossyPaper" as a word interpretable by the printer. The word is decided by the native function by associating it with the printer information. For example, if the value extracted from the printer information is "GlossyPaper", text to be displayed is decided as "glossy paper". As a decision method, the native function holds in advance a correspondence table between these values, and decides text according to the correspondence table.

Note that as an example, the paper size, paper type, print quality, and bordered/borderless settings are made. The present invention, however, is not limited to this. As another example, other setting items such as double-sided/single-sided, color/monochrome, and ON/OFF of image correction are set. Furthermore, not only the print function but also information about image processing and analysis processing processable by the printer, the presence/absence of a silent mode, the presence/absence of the use of a memory card, and a status such as the remaining ink amount may be displayed.

Figure 13:
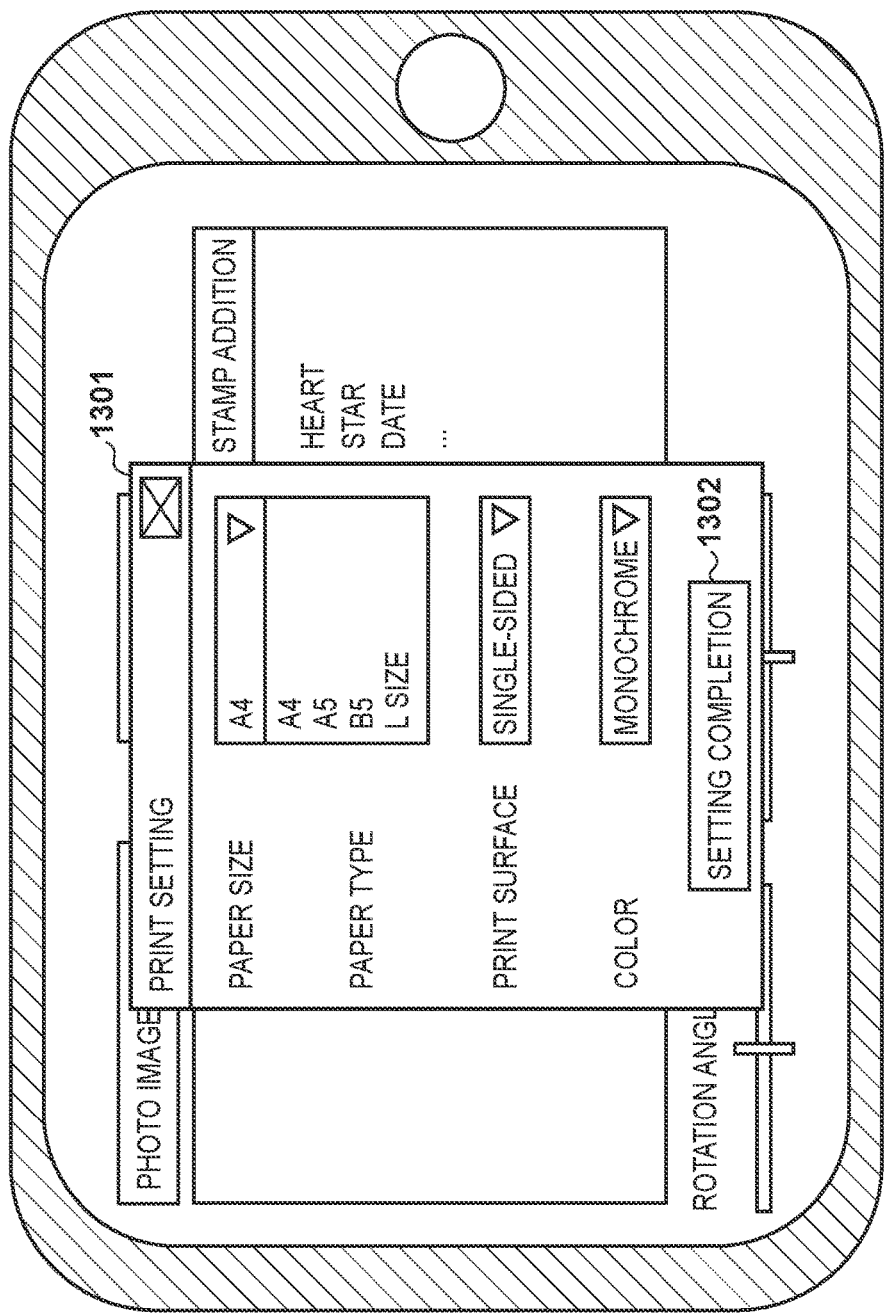
FIG. 13 is a view showing an example of a setting screen.

In step S808, the CPU 100 selects a function to be set in the printer based on a user operation on the setting screen 1301. The setting screen 1301 shown in FIG. 13 is an example in which the HTML description of the above example is rendered using the rendering unit 216, and displayed on the display 104. The printer information is requested via the native layer 218, thereby forming the setting screen 1301 based on the information acquired from the printer information by using the above native function.

Note that the HTML description has been explained to be formed in the script layer 217. However, the present invention is not limited to this. For example, an HTML description may be formed in the native layer 218, rendered in the script layer 217, and displayed on the display 104.

Furthermore, each setting item such as the paper size of the setting screen 1301 is provided as a pull-down menu, and can be selected by a user operation. The setting screen 1301 indicates a state in which a list of selectable items is displayed as a setting item of a paper size by a pull-down menu, and a paper size such as A4 or A5 can be selected by a user operation.

In step S809, upon detecting a user operation on the setting completion button 1302, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer settings of a paper size, paper type, print quality, and bordered/borderless as a character string to the native layer 218.

In step S810, the CPU 100 receives the setting information from the script layer 217 by the binding function. In the native layer 218, a print command is generated based on the received setting information, image data to be printed, and image data of a stamp according to the communication protocol of the printer 112. The printer command is then transmitted to the printer 112 via the printer communication unit 213.

As described above, in response to the request from the script layer 217, the CPU 100 performs communication control to acquire the information from the printer 112 via the native layer 218. This enables the CPU 100 to acquire the performance of the printer 112 and control the UI displayed in the script layer 217.

<Details of Rendering Processing>

Figure 10:
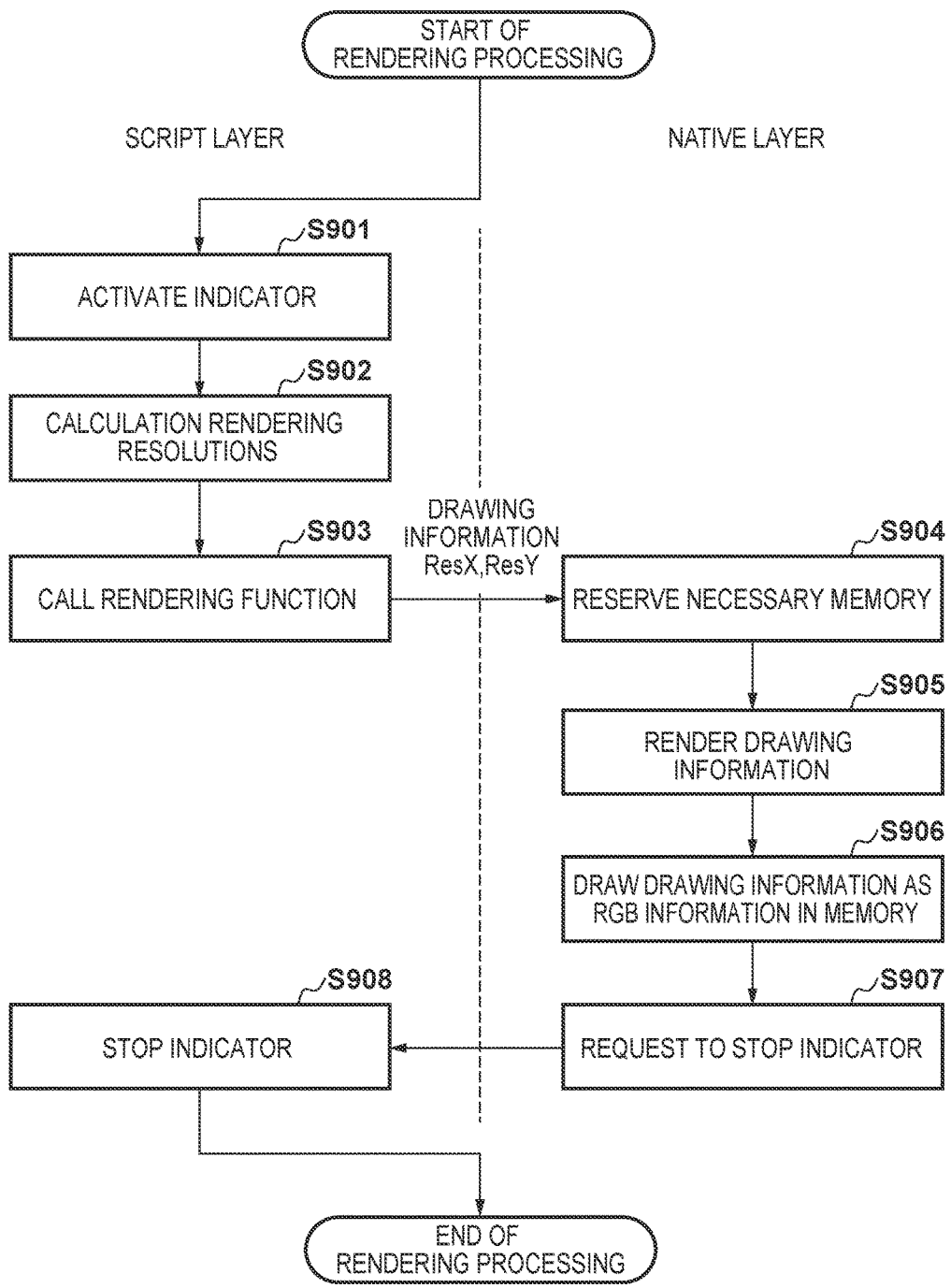
FIG. 10 is a flowchart illustrating details of rendering processing.

Details of the rendering processing in step S27 of FIG. 3 will be described with reference to FIG. 10. Note that the rendering processing in step S27 is performed by the second interpreter 221. The second interpreter 221 is a program module capable of interpreting and drawing/performing a Web standard language, like the first interpreter 214. Note that steps S901 to S903 and S908 are implemented when the CPU 100 performs the program of the script layer 217 and steps S904 to S907 are implemented when the CPU 100 performs the program of the native layer 218.

In step S901, the CPU 100 activates an indicator, and displays it on the display 104. The indicator indicates the UI display of the processing status (for example, predetermined processing is in progress) in the application. For example, a progress bar or the like corresponds to this indicator. It may generally take several to several tens of seconds to perform the rendering processing, and it is thus necessary to display such indicator.

In step S902, the CPU 100 calculates resolution information (rendering resolutions) necessary for rendering. More specifically, the CPU 100 calculates the rendering resolution based on the paper type set in the setting information created in step S809 and the values of ResolutionX and ResolutionY acquired by GetInformation. For example, in this embodiment, assume that the script layer 217 holds the following correspondence table.

TABLE 1

| Paper size | PaperH [mm] | PaperW [mm] |
|---|---|---|
| 4 × 6 | 101.6 | 152.4 |
| A4 | 297 | 210 |
| L size | 89 | 127 |

In table 1, "PaperH" and "PaperW" indicate the height (length) and width of paper, respectively. The rendering resolutions ResX and ResY (the unit is "pixels") can be calculated by:

$ResX = PaperH/25.4 \times ResolutionX$ $ResY = PaperW/25.4 \times ResolutionY$

In step S903, the CPU 100 calls the API of the second interpreter 221 of the native layer 218 by the binding function, and transmits necessary information to the API. More specifically, the calculated rendering resolutions and script information (description information by a canvas) of drawing of the print content are transmitted as the necessary information.

In step S904, the CPU 100 reserves, in the memory, an image area necessary for the rendering processing. A memory size M of the memory to be reserved is calculated by:

$M = ResX \times ResY \times \text{number of elements [bytes]}$ where the number of elements is the number of color components per pixel, which is normally 3 because RGB components are held. The memory size is, for example, a memory size which can be reserved in the RAM 102. If, however, a swap area can be increased in the secondary storage device 103 by using a swap function, a memory size reserved in the swap area is also taken into consideration.

In step S905, the CPU 100 calculates enlargement ratios ExpX and ExpY for converting the drawing information of the print content into necessary resolutions (rendering resolutions), given by:

$ExpX = ResX/CanX$ $ExpY = ResY/CanY$ where CanX and CanY represent the sizes of a canvas area (the unit is "pixels") originally prepared for display.

After the enlargement ratios can be calculated, the CPU 100 performs rendering including scaling of the drawing information using the enlargement ratios. More specifically, scaling of the drawing information is performed using a scale function prepared in Context of the canvas.

In step S906, the CPU 100 draws, as RGB information, the drawing information obtained by rendering in the reserved memory. If rendering succeeds, the CPU 100 transmits an indicator stop request to the script layer 217 in step S907.

In step S908, the CPU 100 stops the indicator, and removes it from the display 104.

<Details of Print Processing>

Details of the print processing in step S28 of FIG. 3 will be described with reference to FIG. 11. Note that steps S1001 to S1003 are implemented when the CPU 100 performs the program of the native layer 218.

In step S1001, the CPU 100 converts the setting information created in step S809 and the image information (RGB image) converted in step S906 into a format usable by the printer 112. The format usable by the printer is image data in a printer vender-specific format such as RGB, JPEG, CMYK, or PDF. In step S1002, the CPU 100 uses the conversion result obtained in step S1001 to generate a printer command to be transmitted to the printer 112. In step S1003, the CPU 100 uses the printer communication unit 213 to transmit the command generated in step S1002 to the printer 112 selected for printing in accordance with the communication protocol usable by the printer.

In step S1004, the printer 112 performs printing according to the command received from the information processing apparatus 115.

As described above, according to this embodiment, in a hybrid application, an index (indicator) indicating that image processing in the native layer is in progress can be presented in the script layer, thereby improving the user convenience.

Second Embodiment

In the first embodiment, the indicator is displayed while performing image processing. To the contrary, in the second embodiment, an arrangement of displaying the processing progress as a processing status by an indicator during image processing will be described. The second embodiment is different from the first embodiment in that the processing progress corresponding to the processing status of a native layer 218 is displayed.

Figure 16:
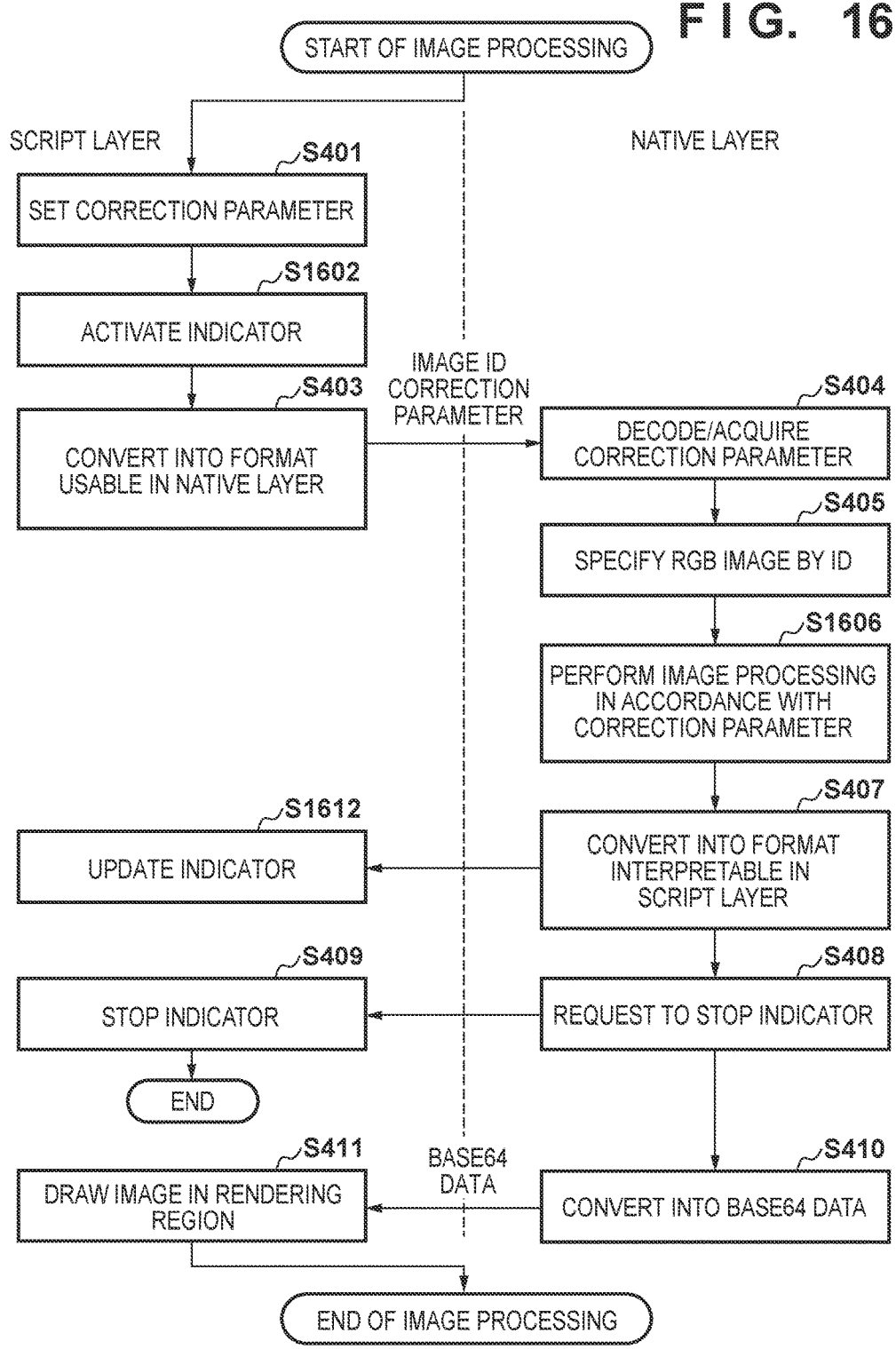
FIG. 16 is a flowchart illustrating details of image processing.

Processing of displaying the processing progress by an indicator during image processing will be described with reference to FIG. 16. Note that this processing is performed as part of image processing shown in FIG. 5. The same step numbers as those in FIG. 5 denote the same processes and a detailed description thereof will be omitted. Note that steps S1602 and S1612 are implemented when a CPU 100 performs the program of a script layer 217, and step S1606 is implemented when the CPU 100 performs the program of the native layer 218.

Figure 17:
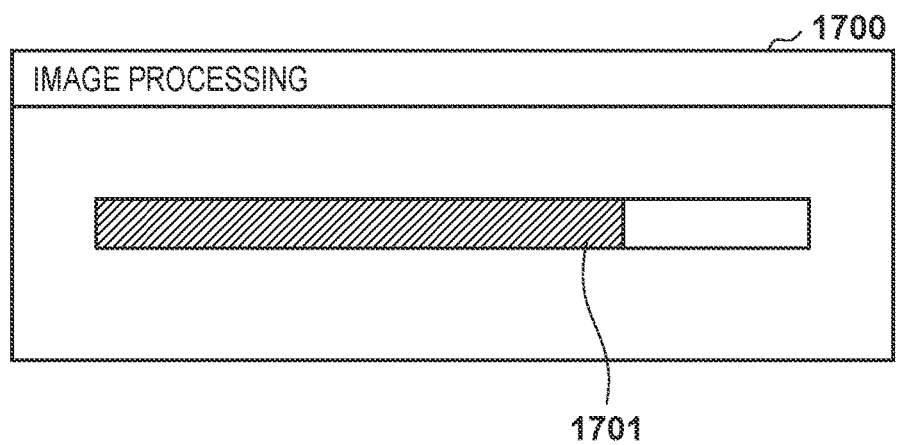
FIG. 17 is a view showing an example of an indicator.

After processing in step S401, in step S1602 the CPU 100 activates an indicator, and displays it on a display 104. The indicator to be activated is registered in advance. For example, an indicator 1700 shown in FIG. 17 is displayed. Note that a predetermined image such as animation incorporated in the OS may be used as the indicator 1700.

The processing progress of an image processing unit 208 is acquired, and then the indicator 1700 shown in FIG. 17 is displayed based on the acquired processing progress. A processing progress display portion 1701 indicates a status bar for displaying the processing progress acquired from the image processing unit 208. In this example, the processing progress is acquired as a rate from the image processing unit 208, and display of the processing progress display portion 1701 is controlled based on the rate.

An example of a script for displaying the indicator 1700 is:

```
<section>
    <h2>ImageProcess</h2>
    <p><progress value="70" max="100"></progress></p>
</section>
```

The above example shows a case in which the processing progresses by 70%. Immediately after the activation in step S1602, the indicator is displayed to indicate 0%.

After processes in step S403 to S405, in step S1606 the CPU 100 determines, based on an acquired correction parameter, image processing to be performed, and performs the image processing for an RGB image. At this time, the native layer 218 transmits the processing progress of the image processing to the script layer 217, thereby updating the processing progress to be displayed on the indicator 1700, and displaying it.

As the update timing, when the image processing unit 208 performs a given amount of image processing, the native layer 218 transmits the processing progress to the script layer 217.

An example of a method of calculating the processing progress is as follows. The processing progress of the image processing for the height H of the RGB image to be processed is calculated as a rate Rate given by:

$$\text{Rate} = y/H \times 100$$

where H represents the height of the RGB image specified in step S405 and y represents the height in progress. The processing progress may be calculated by another index such as the area of the image, as a matter of course. In this example, when the calculated rate Rate becomes a multiple of 10%, the processing progress of the indicator 1700 is updated. Another update timing may also be adopted, as a matter of course.

In step S407, when updating display of the indicator 1700, the CPU 100 converts the rate Rate, that is, the processing progress into base64 data interpretable in the script layer 217. When the base64 data interpretable in the script layer 217, which has been converted from the rate Rate, is set as Rate', the native layer 218 transmits Rate' to the script layer 217.

In step S1612, based on the processing progress (Rate') received from the native layer 218, the CPU 100 updates display of the indicator. In the script layer 217, based on the processing progress Rate' transmitted from the image processing unit 208, the indicator display script is updated. An example of the script for updating the indicator by Rate' is:

```
<section>
    <h2>ImageProcess</h2>
    <p><progress value=Rate' max="100">in progress</progress></p>
</section>
```

A method of transmitting the processing progress to the script layer 217 at the timing of the processing progress of the image processing unit 208 has been explained. However, the present invention is not limited to this. For example, the script layer 217 may inquire of the image processing unit 208 about the processing progress, thereby displaying an inquiry result.

Furthermore, the processing progress is calculated by the image processing unit 208, and the processing progress is converted and displayed in the script layer 217. However, the present invention is not limited to this. For example, the native layer 218 may operate, via the conversion unit, a progress display function set in the script layer 217.

As described above, according to this embodiment, in a hybrid application, an index indicating the processing status of image processing in the native layer can be presented in the script layer, thereby improving the user convenience.

Third Embodiment

In the third embodiment, an arrangement of instructing to interrupt processing from an indicator during image processing will be described. For example, the third embodiment is different from the first and second embodiments in that a script layer 217 issues an interrupt instruction by a user instruction for the indicator, thereby controlling image processing being performed in a native layer 218.

Figure 18:
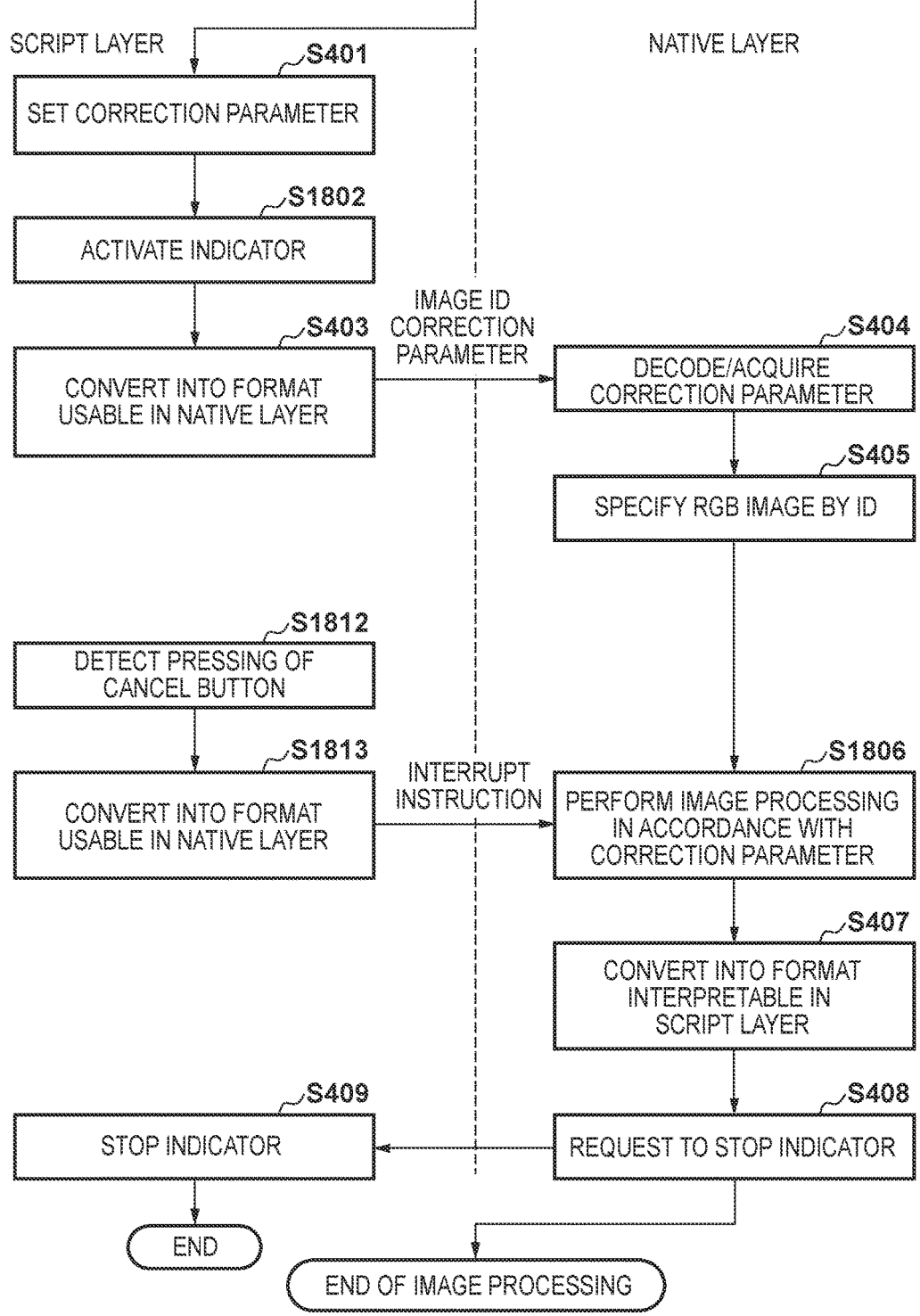
FIG. 18 is a flowchart illustrating details of image processing.

Processing of instructing to interrupt processing from an indicator during image processing will be described with reference to FIG. 18. This processing is performed as part of image processing shown in FIG. 5. The same step numbers as those in FIG. 5 denote the same processes and a detailed description thereof will be omitted. Note that steps S1802, S1812, and S1813 are implemented when a CPU 100 performs the program of the script layer 217, and step S1806 is implemented when the CPU 100 performs the program of the native layer 218.

Figure 19:
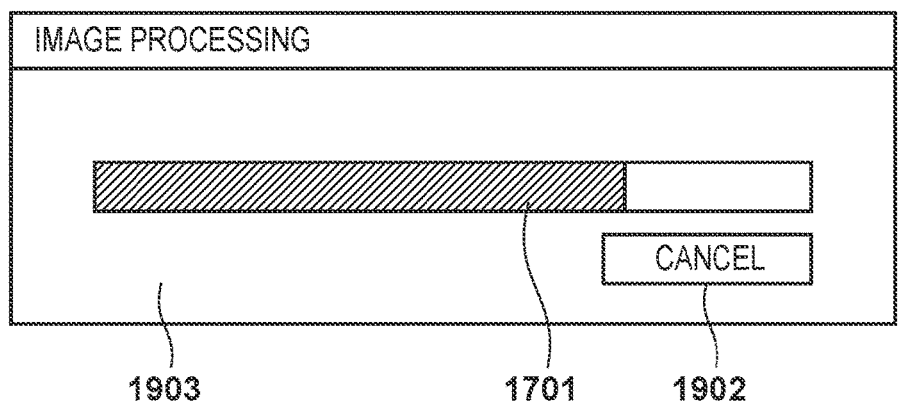
FIG. 19 is a view showing an example of an indicator.

After processing in step S401, in step S1802 the CPU 100 activates an indicator, and displays it on a display 104. The indicator to be activated is registered in advance. For example, an indicator 1903 shown in FIG. 19 is displayed. Note that the same reference numerals as those in FIG. 17 denote the same components in FIG. 19 and a detailed description thereof will be omitted.

The indicator 1903 shown in FIG. 19 includes a cancel button 1902 as an instruction portion for instructing to interrupt the image processing, in addition to a processing progress display portion 1701. When the cancel button 1902 is pressed, an instruction to interrupt the image processing being executed in the native layer 218 is issued.

An example of a script for displaying the indicator 1903 is:

```
<header>
    function cancel_process( ){
        cancel_baind( );
    }
</header>
<section>
    <h2>ImageProcess</h2>
    <p><progress value=Rate' max="100">in progress</progress></p>
    <p><input type="button" value="cancel" onclick="cansel_process( )"></p>
</section>
```

The cancel_baind function is bound from JavaScript, and performs interrupt processing of the native layer 218. This function converts an interrupt signal to be transmitted to the native layer 218.

The interrupt processing is implemented when an image processing unit 208 includes a signal reception unit as follows. The signal reception unit interrupts the image processing by the interrupt signal transmitted from the cancel_baind function.

```
int imageProcess(void)
{
    if (signal(SIGINT, (interrupt processing function))
    == ERROR)
    {
        //image processing performing unit
    }
}
```

After processes in steps S402 to S405, in step S1806 the CPU 100 determines, based on an acquired correction parameter, image processing to be performed, and performs the image processing for an RGB image. While performing the image processing, the indicator 1903 is displayed on the display 104.

In step S1812, the CPU 100 detects pressing of the cancel button 1902 of the indicator 1903. In response to this, the script layer 217 issues an image processing interrupt instruction. In step S1813, the CPU 100 converts the issued interrupt signal into a format usable in the native layer 218. After that, the script layer 217 transmits the converted interrupt signal to the native layer 218. Upon receiving the interrupt signal, the image processing unit 208 of the native layer 218 interrupts the image processing based on the received interrupt signal.

Note that the image processing and monitoring of an image processing interrupt instruction may be performed by multiprocessing. When performing the processes by multiprocessing, performing environment information may be acquired, and a process division number may be changed according to the information. To resume the interrupted image processing, an instruction portion for issuing a resumption instruction may be provided on the indicator 1903.

As described above, according to this embodiment, in a hybrid application, it is possible to control processing in the native layer by a user instruction from the script layer, thereby improving the user convenience.

Fourth Embodiment

In the fourth embodiment, a case in which an error message is displayed when a problem occurs in a processing unit different from an image processing unit 208 during the image processing will be described. The fourth embodiment is different from the first to third embodiments in that an error message is displayed when a problem occurs in a native layer 218, in addition to an indicator in progress.

Figure 20:
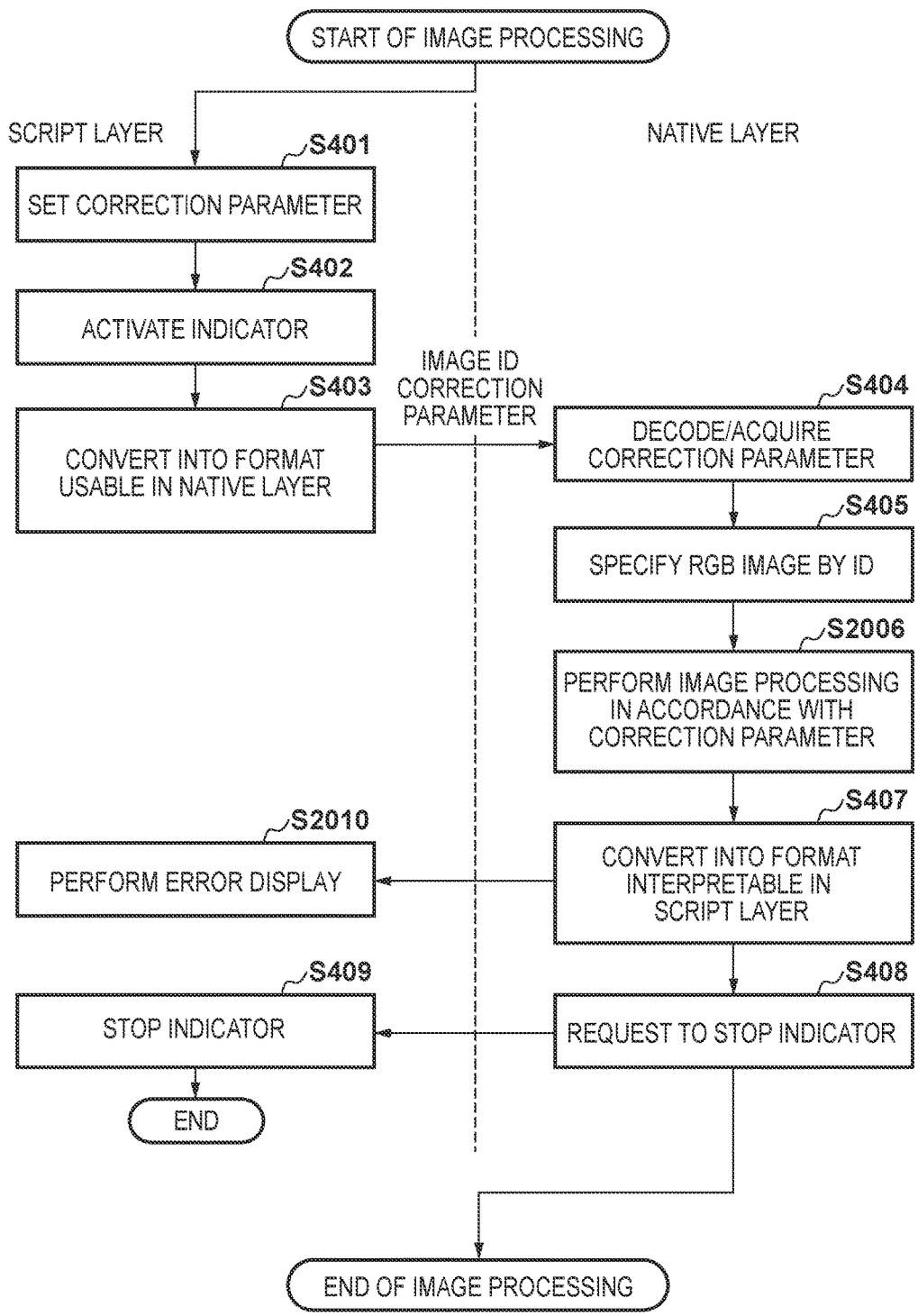
FIG. 20 is a flowchart illustrating details of image processing.

Processing of displaying, in a script layer 217, an error which occurs in image processing will be described with reference to FIG. 20. Note that this processing is performed as part of image processing shown in FIG. 5. The same step numbers as those in FIG. 5 denote the same processes and a detailed description thereof will be omitted. Note that processing in step S2010 is implemented when a CPU 100 performs the program of the script layer 217, and step S2006 is implemented when the CPU 100 performs the program of the native layer 218.

After processes in steps S401 to S405, when an error occurs while performing image processing, the CPU 100 generates error information in step S2006. As an example, as shown in the following program, when the OS notifies that the memory is insufficient while performing the image processing in the native layer 218, the CPU 100 returns an error message indicating memory shortage to the script layer 217. On the other hand, if the OS notifies that an error different from memory shortage has occurred, the CPU 100 returns a message indicating an unexpected error to the script layer 217. int image_process((image data), (image processing parameter))

```
{
    //check image processing parameter
    if(is image processing parameter incorrect?)
    {
        return ERROR_PARAM;
    }
    //reserve a memory
    //perform memory reservation processing to perform
    an error check
    if (has memory reservation failed?)
    {
        return ERROR_MEMORY;
    }
    //image processing unit
    if(has an unexpected error occurred?)
    {
        return ERROR_INVARID;
    }
}
```

The errors described in the program are associated in advance with constants. A value "ERROR_PARAM" indicates an error when the image processing parameter is incorrect. A value "ERROR_MEMORY" indicates an error when it is impossible to reserve a necessary memory at the time of performing the image processing. A value "ERROR_INVARID" indicates an error when an unexpected problem occurs. Errors other than the above ones may be handled, as a matter of course.

Based on an issued error constant, the native layer 218 performs replacement by a corresponding error message. Furthermore, in step S407, the CPU 100 converts the error message into data (for example, base64 data) in a format interpretable in the script layer 217, and transmits the data to the script layer 217.

In step S2010, the CPU 100 performs error display on a display 104 based on the received data (error message). An example of an error display script is:

```
<html>
<head>
    <script type="text/javascript"
    language="javascript">
        function error( ) {
            window.alert(ERROR_MESSAGE \n);
        }
    </script>
</head>
</html>
```

In the script, ERROR_MESSAGE is changed in accordance with the error message received from the native layer 218.

In this example, the error constant is converted into an error message in the native layer 218. The present invention, however, is not limited to this. Conversion into an error message may be performed in the script layer 217. In this case, the error constant is converted into base64 data in the native layer 218, and the base64 data is transmitted to the script layer 217. In the script layer 217, based on the error constant associated in advance and the corresponding base64 data, the base64 data is converted into an error message, and then displayed.

As described above, according to this embodiment, in a hybrid application, an index indicating an error while performing image processing in the native layer can be presented in the script layer, thereby improving the user convenience.

Fifth Embodiment

The indicator according to each of the aforementioned embodiments is merely an example. Any form which can notify the user of the processing progress may be adopted.

In each of the aforementioned embodiments, image processing is performed in the native layer 218. The present invention, however, is not limited to this. For example, the present invention is also applicable to processing other than the image processing, or device control processing for controlling a device such as a printer.

Furthermore, a printer is selected first after an application is activated. The present invention, however, is not limited to this. For example, a printer can be set in a step of making print settings, and an information acquisition command can be transmitted to the printer.

Data such as thresholds and information shown in Table 1 according to the above embodiment may be held in advance in the application, or may be included in the printer main body and acquired by a GetInformation command. Alternatively, the data may be held in the server 114 shown in FIG. 1, and acquired via the network 113 upon activation of the application.

In addition, as the printer according to each of the aforementioned embodiments, an inkjet printer, a laser printer, a dye-sublimation printer, a dot impact printer, or the like can be used. These printers may be so-called multi-function peripherals having not a single function but the printer function, the scanner function, and the like.

In each of the aforementioned embodiments, two interpreters for interpreting/performing an instruction in the script layer are provided. The present invention, however, is not limited to this. For example, a plurality of interpreters may be held in the native layer 218 and used in accordance with a language used for a UI and the print purpose.

Furthermore, in each of the aforementioned embodiments, a case in which a hybrid application is operated on a portable information terminal as the information processing apparatus 115 has been exemplified. The present invention, however, is not limited to this. For example, as an environment in which the hybrid application operates, in addition to information terminals represented by a smartphone and table PC, other electronic apparatuses such as a PC, server, game machine, and digital camera are possible.

In addition, in each of the aforementioned embodiments, the printer has been exemplified as an external device. The present invention, however, is not limited to this. For example, another electronic apparatus capable of providing information about itself, such as another smartphone, tablet PC, PC, server, game machine, or scanner, may be used as an external device. For example, it is possible to acquire, from the script layer, information about the electronic apparatus such as the function of the electronic apparatus like the battery level, communication status, wireless LAN connection presence/absence, GPS, temperature, humidity, and acceleration of another portable information terminal.

Examples of an external device are an electric appliance and car. For example, it is possible to acquire information of an electronic apparatus such as an external refrigerator, washing machine, air conditioner, lighting, vacuum cleaner, or thermo pot from the script layer on the portable information terminal, and adjust ON/OFF and output of the function of the electronic apparatus.

Furthermore, in each of the aforementioned embodiments, as a method of drawing a content (a photo image or stamp image), the canvas function of JavaScript has been exemplified. A method of drawing a content is not limited to this. For example, it is possible to draw a content using SVG (Scalable Vector Graphics).

Note that the functions of the above embodiments can also be implemented by the following arrangement. That is, the functions of the embodiments are also implemented when program codes for performing the processes of the embodiments are supplied to a system or apparatus, and the computer (or the CPU or MPU) of the system or apparatus performs the program codes. In this case, the program codes read out from a storage medium implement the functions of the above-described embodiments, and the storage medium storing the program codes also implement the functions of the embodiments.

Furthermore, the program codes for implementing the functions of the embodiments may be performed by a single computer (CPU or MPU) or a plurality of computers in cooperation. Also, a computer may perform the program codes or hardware such as a circuit for implementing the functions of the program codes may be provided. Alternatively, some of the program codes may be implemented by hardware and the remaining program codes may be performed by the computer.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135175, filed Jun. 30, 2014, which is hereby incorporated by reference herein in its entirety.

What is claimed is:

1. An information processing apparatus capable of performing a software program including (1) a first program layer with an instruction set to be interpreted and performed by a processor of the information processing apparatus and (2) a second program layer with an instruction set compiled in advance by a unit other than the processor, the information processing apparatus comprising:
the processor, operatively coupled to a memory, the processor serving as units comprising:
(a) a transmission unit configured to transmit parameter information used for performing image processing from the first program layer to the second program layer;
(b) an image processing unit configured to perform the image processing in the second program layer based on the parameter information;
(c) a display control unit configured to display an indicator related to the image processing on a screen of the information processing apparatus;
(d) an instruction unit configured to issue an instruction to control display of the indicator from the second program layer to the first program layer; and
(e) a print instruction unit configured to cause a printing apparatus to perform print processing based on data for which the image processing has been performed,
wherein in a case where the image processing that the image processing unit performs in the second program layer based on the parameter information is completed, the instruction unit issues the instruction corresponding to the completion of the image processing from the second program layer to the first program layer, and
wherein in a case where the instruction unit issues the instruction corresponding to the completion of the image processing from the second program layer included in the software program performed by the information processing apparatus to the first program layer included in the software program performed by the information processing apparatus, the indicator is caused to disappear from the screen before the printing apparatus completes the print processing.

2. The information processing apparatus according to claim 1, wherein the processor further serves as an acquisition unit configured to acquire a processing status,
wherein the second program layer performs acquisition processing of the processing status and transmission processing of the parameter information.

3. The information processing apparatus according to claim 1, wherein display contents of the indicator are updated in response to reception of the instruction related to a processing status in the second program layer, and
wherein the indicator is caused to disappear in response to reception of the instruction to stop the indicator.

4. The information processing apparatus according to claim 1, wherein if data indicating a processing error is received, information about the error is displayed.

5. The information processing apparatus according to claim 1, wherein data received by the first program layer from the second program layer is converted data interpretable in the first program layer.

6. The information processing apparatus according to claim 1, wherein the instruction set in the first program layer is described in a Web standard language.

7. A control method for an information processing apparatus capable of performing a software program including (1) a first program layer with an instruction set to be interpreted and performed by a processor of the information processing apparatus and (2) a second program layer with an instruction set compiled in advance by a unit other than the processor, the control method comprising:
transmitting parameter information used for performing image processing from the first program layer to the second program layer;
performing the image processing in the second program layer based on the parameter information;
displaying an indicator related to the image processing on a screen of the information processing apparatus;
issuing an instruction to control display of the indicator from the second program layer to the first program layer; and
causing a printing apparatus to perform print processing based on data for which the image processing has been performed,
wherein in a case where the image processing which is performed in the second program layer based on the parameter information is completed, the instruction corresponding to the completion of the image processing is issued from the second program layer to the first program layer, and
wherein in a case where the instruction corresponding to the completion of the image processing is issued from the second program layer included in the software program performed by the information processing apparatus to the first program layer included in the software program performed by the information processing apparatus, the indicator is caused to disappear from the screen before the printing apparatus completes the print processing.

8. The control method according to claim 7, further comprising:
acquiring a processing status,
wherein acquisition processing of the processing status and transmission processing of the parameter information is performed in the second program layer.

9. The control method according to claim 7, wherein display contents of the indicator are updated in response to reception of the instruction related to a processing status in the second program layer, and
wherein the indicator is caused to disappear in response to reception of the instruction to stop the indicator.

10. The control method according to claim 7, wherein if data indicating a processing error is received, information about the error is displayed.

11. The control method according to claim 7, wherein data received by the first program layer from the second program layer is converted data interpretable in the first program layer.

12. The control method according to claim 7, wherein the instruction set in the first program layer is described in a Web standard language.

13. The control method according to claim 7, wherein the software program performed by the information processing apparatus is a hybrid application.

14. A control method for an information processing apparatus capable of performing a software program including (1) a first program layer with an instruction set to be interpreted and performed by a processor of the information processing apparatus and (2) a second program layer with an instruction set compiled in advance by a unit other than the processor, the control method comprising:
transmitting parameter information used for performing image processing from the first program layer to the second program layer;

performing the image processing in the second program layer based on the parameter information;

displaying an indicator related to the image processing on a screen of the information processing apparatus;

issuing an instruction to control display of the indicator from the second program layer to the first program layer; and causing a printing apparatus to perform print processing based on data for which the image processing has been performed, wherein in a case where the image processing which is performed in the second program layer based on the parameter information is completed, the instruction corresponding to the completion of the image processing is issued from the second program layer to the first program layer, and wherein in a case where the instruction corresponding to the completion of the image processing is issued from the second program layer included in the software program performed by the information processing apparatus to the first program layer included in the software program performed by the information processing apparatus, the indicator is stopped, and then the indicator is caused to disappear from the screen before the printing apparatus completes the print processing.

15. The control method according to claim 14, further comprising:

acquiring a processing status, wherein acquisition processing of the processing status and transmission processing of the parameter information is performed in the second program layer.

16. The control method according to claim 14, wherein display contents of the indicator are updated in response to reception of the instruction related to a processing status in the second program layer, and wherein the indicator is stopped and then the indicator is caused to disappear in response to reception of the instruction to stop the indicator.

17. The control method according to claim 14, wherein if data indicating a processing error is received, information about the error is displayed.

18. The control method according to claim 14, wherein data received by the first program layer from the second program layer is converted data interpretable in the first program layer.

19. The control method according to claim 14, wherein the instruction set in the first program layer is described in a Web standard language.

* * * * *